(12) United States Patent
Warshaw

(10) Patent No.: US 12,352,052 B2
(45) Date of Patent: Jul. 8, 2025

(54) HANDRAIL ELEMENT CONNECTOR AND HANDRAIL ASSEMBLY INCLUDING THE SAME

(71) Applicant: 9220-6820 Québec Inc., Dorval (CA)

(72) Inventor: William Kell Warshaw, Montréal (CA)

(73) Assignee: 9220-6820 Québec Inc., Dorval (CA)

( * ) Notice: Subject to any disclaimer, the term of this patent is extended or adjusted under 35 U.S.C. 154(b) by 461 days.

(21) Appl. No.: 17/792,427

(22) PCT Filed: Jan. 18, 2021

(86) PCT No.: PCT/CA2021/050049
§ 371 (c)(1),
(2) Date: Jul. 13, 2022

(87) PCT Pub. No.: WO2021/142552
PCT Pub. Date: Jul. 22, 2021

(65) Prior Publication Data
US 2023/0037811 A1    Feb. 9, 2023

Related U.S. Application Data

(60) Provisional application No. 62/962,570, filed on Jan. 17, 2020.

(51) Int. Cl.
*E04F 11/18*    (2006.01)
(52) U.S. Cl.
CPC ................. *E04F 11/1836* (2013.01)
(58) Field of Classification Search
CPC ... E04F 11/18; E04F 11/1817; E04F 11/1836; E04F 11/1838; E04F 2011/1819; E04F 2011/1921; F16B 7/0406; F16B 7/0413

(Continued)

(56) References Cited

U.S. PATENT DOCUMENTS 4,108,422 A * 8/1978 Fleischmann ....... E04F 11/1836
403/255
4,557,467 A * 12/1985 Lin ..................... E04F 11/1836
403/292

(Continued)

FOREIGN PATENT DOCUMENTS

DE    102012100556 A1    8/2012
EP         2163703 A1    3/2010

OTHER PUBLICATIONS

International Search Report issued in PCT/CA2021/050049 (Mar. 29, 2021).

(Continued)

*Primary Examiner* — Jonathan P Masinick
(74) *Attorney, Agent, or Firm* — Reising Ethington P.C.

(57) ABSTRACT

A handrail element connector for connecting together first and second handrail elements, the connector comprising: at least one connecting portion for engaging a first handrail element internal cavity defined in one of the first and second handrail elements, the connecting portion including: at least one connector axial coupling portion couplable to a corresponding handrail element axial coupling portion located in the first handrail element internal cavity to prevent axial movement of the connector relative to the handrail element; and at least one connector angular coupling portion couplable to a corresponding handrail element angular coupling portion located in the first handrail element internal cavity to prevent rotation of the connector relative to the handrail element.

25 Claims, 17 Drawing Sheets

(58) Field of Classification Search
USPC .................................................. 256/65.15
See application file for complete search history.

(56) References Cited

U.S. PATENT DOCUMENTS

| | | | | |
|---|---|---|---|---|
| 5,326,187 A * | 7/1994 | St. Marie | ............ | E04F 11/1836 403/402 |
| 5,544,865 A * | 8/1996 | Abbaticchio | ....... | E04F 11/1804 403/3 |
| 5,573,346 A * | 11/1996 | Goodwin | .............. | F16B 7/0413 403/283 |
| 6,386,518 B1 * | 5/2002 | Shreiner | ............. | E04F 11/1804 403/374.1 |
| 7,044,450 B2 * | 5/2006 | Striebel | ............... | E04F 11/1817 256/65.16 |
| 7,618,210 B2 * | 11/2009 | Wagner | ............... | E04F 11/1836 403/397 |
| 7,967,522 B2 * | 6/2011 | Goad | .................. | E04F 11/1808 403/205 |
| 8,070,137 B2 * | 12/2011 | Bennett | ................. | B21C 23/142 256/65.16 |
| 8,356,802 B2 * | 1/2013 | Reich | .................. | E04F 11/1836 256/65.09 |
| 9,637,931 B2 * | 5/2017 | Hart | .................... | E04H 17/1448 |
| 10,480,195 B2 * | 11/2019 | Warshaw | ............ | E04F 11/1834 |
| 11,414,873 B2 * | 8/2022 | Warshaw | ............ | E04F 11/1804 |
| 2002/0172551 A1 * | 11/2002 | Greaves | .............. | E04F 11/1808 403/359.1 |
| 2003/0126751 A1 * | 7/2003 | Izumi | .................. | E04F 11/1812 33/333 |
| 2009/0016815 A1 * | 1/2009 | Moore | ................ | E04F 11/1804 403/300 |
| 2015/0252569 A1 | 9/2015 | Warshaw | | |
| 2018/0179781 A1 * | 6/2018 | Munro | ................ | E04F 11/1836 |
| 2022/0186503 A1 * | 6/2022 | Kichise | ............... | E04F 11/1817 |

OTHER PUBLICATIONS

Written Opinion issued in PCT/CA2021/050049 (Mar. 29, 2021).
Supplementary Search Report issued in corresponding European Patent Application No. 21741959.7 (Jan. 23, 1 2024).

* cited by examiner

HANDRAIL ELEMENT CONNECTOR AND HANDRAIL ASSEMBLY INCLUDING THE SAME

TECHNICAL FIELD

The technical field relates to handrails, and more particularly to connectors for connecting together handrail components of a handrail assembly.

BACKGROUND

Continuous railings and/or handrails that transition from sloping to horizontal and/or that follow angle changes between walls are desirable for appearance, safety and/or regulatory compliance. Moreover, continuous railings or handrails are helpful for seniors or people with walking difficulties.

Such handrail assemblies usually require a plurality of specific connectors to connect together adjacent handrail sections that can be of different shapes and/or dimensions and/or to mount a portion of the handrail assembly to a support structure such as a wall.

SUMMARY

According to one aspect, there is provided a handrail element connector for connecting together first and second handrail elements, at least one of the first and second handrail elements including a first handrail element internal cavity having a handrail element axial coupling portion and a handrail element angular coupling portion located in the first handrail element internal cavity, the handrail element connector comprising: at least one connecting portion engageable with the first handrail element internal cavity, the connecting portion including: at least one connector axial coupling portion couplable to the handrail element axial coupling portion to prevent axial movement of the handrail element connector relative to the first handrail element; and at least one connector angular coupling portion couplable to the handrail element angular coupling portion to prevent rotation of the handrail element connector relative to the first handrail element.

In at least one embodiment, the at least one connecting portion includes a first connecting portion for engaging the first handrail element cavity and a second connecting portion for engaging a second handrail element internal cavity of the second handrail element, the handrail element connector being fully enclosed in the first and second handrail element internal cavities when the first and second handrail elements are connected together.

In at least one embodiment, the connector axial coupling portion includes a coupling flange defining a first abutting surface for abutting a second abutting surface defined in the first handrail element internal cavity.

In at least one embodiment, the connector angular coupling portion includes a plurality of coupling teeth extending substantially radially outwardly away from a central longitudinal axis of the handrail element connector, the coupling teeth being shaped and dimensioned to engage corresponding teeth located in the first handrail element internal cavity.

According to another aspect, there is also provided a kit for forming a handrail portion comprising: first and second handrail elements; and a handrail element connector as described above; wherein the handrail element connector is axially and angularly couplable to at least one of the first and second handrail elements.

According to another aspect, there is also provided handrail assembly including: a first handrail element including a first element internal cavity having a first handrail element axial coupling portion and a first handrail element angular coupling portion located therein; a second handrail element; a handrail element connector for connecting together first and second handrail elements, the handrail element connector including: at least one connecting portion engageable with one of the first and second handrail element internal cavities, the connecting portion including: at least one connector axial coupling portion couplable to the handrail element axial coupling portion to prevent axial movement of the connector relative to the handrail element; and at least one connector angular coupling portion couplable to the handrail element angular coupling portion to prevent rotation of the connector relative to the handrail element.

In at least one embodiment, the at least one connecting portion includes a first connecting portion for engaging the first element internal cavity.

In at least one embodiment, the first handrail element is a straight handrail element and the second handrail element is a curved handrail element.

In at least one embodiment, the curved handrail element includes lower and upper handrail portions which substantially define opposite halves of the curved handrail element.

In at least one embodiment, the lower and upper handrail portions are connectable to each other using at least one mechanical fastener.

In at least one embodiment, the handrail element connector is disc-shaped and has a connector axis.

In at least one embodiment, the handrail element connector is symmetrical about a central symmetry plane extending substantially perpendicularly to the connector axis.

In at least one embodiment, the handrail element connector has a connector body and the connector axial coupling portion includes a coupling groove extending along at least a portion of an outer periphery of the connector body.

In at least one embodiment, the coupling groove has substantially V-shaped cross-section.

In at least one embodiment, the handrail element comprises an inner surface facing inwardly towards the element internal cavity and a coupling lip protruding substantially radially inwardly from the inner surface, the coupling lip being shaped and dimensioned to be at least partially received in the coupling groove of the handrail element connector.

In at least one embodiment, the connector axial coupling portion includes a coupling flange defining a first abutting surface and wherein the first handrail element axial coupling portion includes a second abutting surface for abutting the first abutting surface.

In at least one embodiment, the connector angular coupling portion includes a first plurality of coupling teeth extending substantially radially outwardly away from a central longitudinal axis of the connector, and further wherein the first handrail element includes a second plurality of coupling teeth extending substantially radially inwardly into a corresponding one of the first and second handrail element internal cavities, the first plurality of teeth being shaped and dimensioned to engage the second plurality of teeth.

In at least one embodiment, each one of the first plurality of coupling teeth includes a teeth edge, the teeth edges of the first plurality of coupling teeth extending substantially parallel to each other, and along a direction substantially parallel to the connector axis.

In at least one embodiment, the coupling teeth are angled away from each other at regular intervals.

In at least one embodiment, the coupling teeth are angled away from each other by an angle of less than 5 degrees.

In at least one embodiment, the coupling teeth are angled away from each other by an angle of about 2 degrees.

In at least one embodiment, the coupling teeth are formed on at least a portion of the outer periphery of the coupling flange.

In at least one embodiment, the outer periphery of the coupling flange comprises at least one teeth-free portion.

In at least one embodiment, the second handrail element includes a second element internal cavity having a second handrail element axial coupling portion and a second handrail element angular coupling portion located therein, and wherein the at least one connecting portion includes a second connecting portion for engaging the second element internal cavity.

In at least one embodiment, the handrail element connector comprises at least one fastener-receiving through opening, each fastener-receiving through opening being shaped and dimensioned to receive a corresponding connector fastener.

In at least one embodiment, the handrail element connector comprises four fastener-receiving through openings.

In at least one embodiment, the handrail element connector includes at least one fastener-engaging opening.

In at least one embodiment, the handrail assembly further comprises at least one spacing handrail element connector configured to be positioned between the handrail element connector and the second handrail element for connecting the handrail element connector to the second handrail element.

In at least one embodiment, the at least one spacing handrail element connector includes a plurality of spacing handrail element connectors stacked together.

In at least one embodiment, each spacing handrail element includes a spacing body and a connector-receiving cavity formed in the spacing body for receiving at least a portion of the handrail element connector.

In at least one embodiment, the spacing body includes an inner surface at least partially delimiting the connector-receiving cavity and a plurality of coupling teeth formed in the inner surface.

In at least one embodiment, the spacing handrail element connector includes a spacing connector coupling flange having a plurality of coupling teeth formed on an outer periphery thereof.

In at least one embodiment, the second handrail element includes an extruded handrail element.

In at least one embodiment, the extruded handrail element includes a connector-receiving channel and wherein the handrail element connector an extrusion-coupling end portion shaped and dimensioned to engage the connector-receiving channel.

In at least one embodiment, the extrusion-coupling end portion includes at least one fastener-receiving openings, each fastener-receiving opening being configured to receive a corresponding mechanical fastener to secure the handrail element connector to the extruded handrail element.

In at least one embodiment, the second handrail element includes a pipe element.

In at least one embodiment, the handrail element connector includes an expandable connecting portion at least partially engageable in the pipe element and at least one of axially and angularly couplable therewith.

In at least one embodiment, the expandable connecting portion comprises a plurality of pipe-connecting arms at least partially spaced-apart from each other and defining therebetween a fastener-receiving channel extending along a connector axis of the handrail element connector, the fastener-receiving channel being substantially tapered such that the plurality of pipe-connecting arms are moved radially away from each other upon engagement of an expansion fastener in the fastener-receiving channel.

In at least one embodiment, the handrail assembly further includes a handrail cap comprising the expansion fastener.

In at least one embodiment, the expandable connecting portion further includes a plurality of pipe engaging ribs extending radially outwardly from the plurality of pipe-connecting arms for abutting against an inner surface of the pipe element.

In at least one embodiment, the pipe engaging ribs are substantially disc-shaped and extends substantially transversely relative to the connector axis.

In at least one embodiment, the pipe engaging ribs are substantially elongated and extend substantially parallel to the connector axis.

In at least one embodiment, the handrail element connector is configured to be connected to an outer surface of the second handrail element.

In at least one embodiment, the handrail element connector includes a connector axis and the second handrail element includes a longitudinal axis, the connector axis extending substantially perpendicular to the longitudinal axis of the second handrail element when the handrail element connector is connected to the outer surface of the second handrail element.

In at least one embodiment, the handrail element connector includes a first connecting portion for connection with the first handrail element and a second connecting portion for connection with the second handrail element, the second connecting portion being shaped and dimensioned to substantially conform to a portion of the outer surface of the second handrail element.

DETAILED DESCRIPTION

Figure 1:
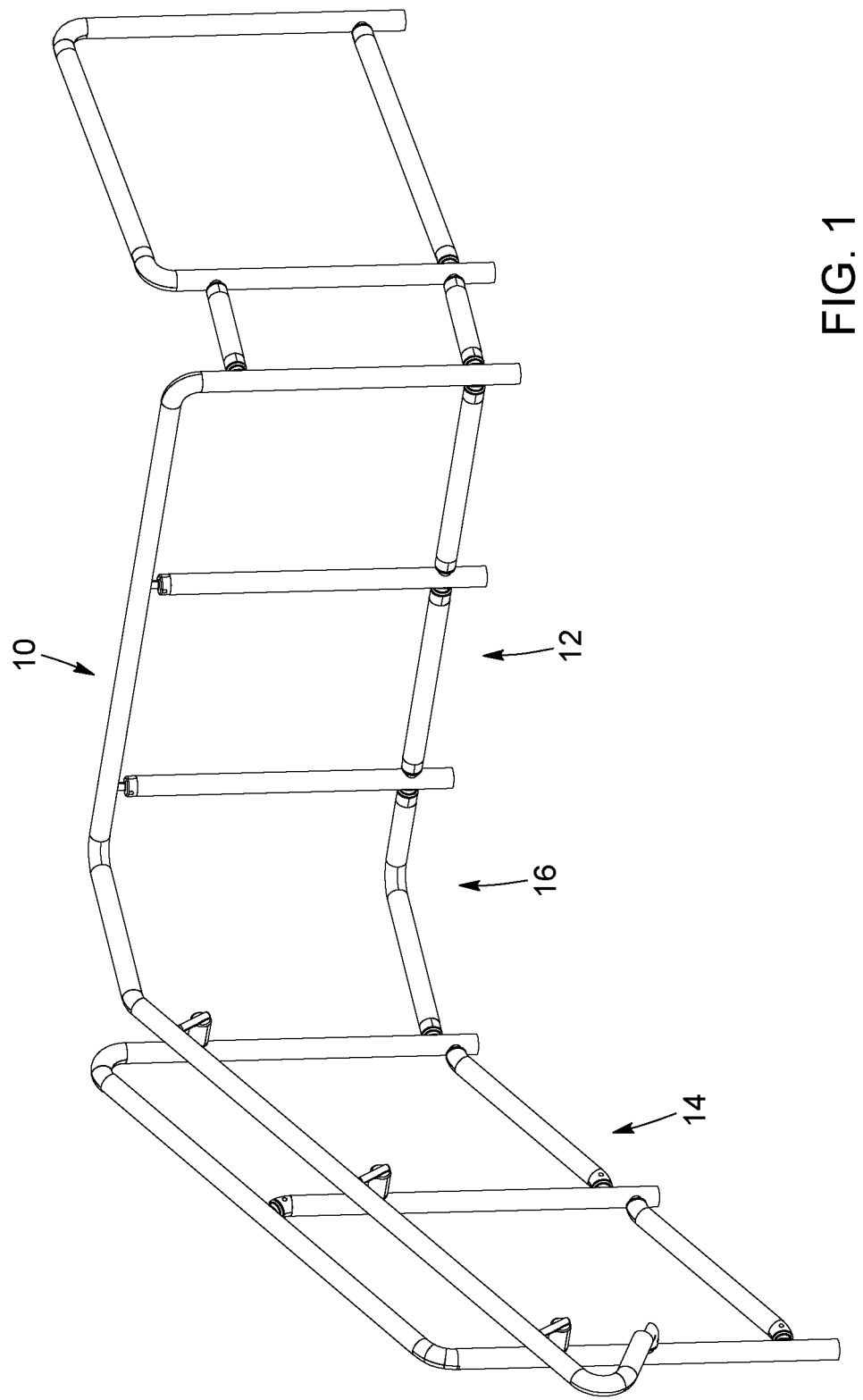
FIG. 1 is a front perspective view of a handrail assembly comprising a plurality of handrail elements connected to each other by a plurality of handrail element connectors in accordance with several embodiments of the present disclosure.

In the following description, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional and are given for exemplification purposes only.

Moreover, it will be appreciated that positional descriptions such as "above", "below", "forward", "rearward", "left", "right" and the like should, unless otherwise indicated, be taken in the context of the figures only and should not be considered limiting. Moreover, the figures are meant to be illustrative of certain characteristics of the different components of the handrail assembly and are not necessarily to scale.

To provide a more concise description, some of the quantitative expressions given herein may be qualified with the term "about". It is understood that whether the term "about" is used explicitly or not, every quantity given herein is meant to refer to an actual given value, and it is also meant to refer to the approximation to such given value that would reasonably be inferred based on the ordinary skill in the art, including approximations due to the experimental and/or measurement conditions for such given value.

In the following description, an embodiment is an example or implementation. The various appearances of "one embodiment", "an embodiment" or "some embodiments" do not necessarily all refer to the same embodiments. Although various features may be described in the context of a single embodiment, the features may also be provided separately or in any suitable combination. Conversely, although the invention may be described herein in the context of separate embodiments for clarity, it may also be implemented in a single embodiment. Reference in the specification to "some embodiments", "an embodiment", "one embodiment" or "other embodiments" means that a particular feature, structure, or characteristic described in connection with the embodiments is included in at least some embodiments, but not necessarily all embodiments.

Furthermore, it is to be understood that the disclosure can be carried out or practiced in various ways and that the disclosure can be implemented in embodiments other than the ones outlined in the description above. It is to be understood that the terms "including", "comprising", and grammatical variants thereof do not preclude the addition of one or more components, features, steps, or integers or groups thereof and that the terms are to be construed as specifying components, features, steps or integers. If the specification or claims refer to "an additional" element, that does not preclude there being more than one of the additional element. It is to be understood that where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included.

The descriptions, examples, methods and materials presented in the claims and the specification are not to be construed as limiting but rather as illustrative only. Meanings of technical and scientific terms used herein are to be commonly understood as by one of ordinary skill in the art to which the invention belongs, unless otherwise defined. It will be appreciated that the methods described herein may be performed in the described order, or in any suitable order.

Referring now to the drawings, and more particularly to FIG. 1, there is shown a rail assembly 10 comprising a plurality of safety guardrail sections and handrail sections. In the embodiment shown, the rail assembly 10 is configured to be secured to a floor (not represented) such that it extends upwardly from the floor to allow a user to grab or lean on a portion of the rail assembly 10, or to provide a physical barrier, such as along a floor's side edge, to prevent a user from falling off the edge.

As described in detail below, the handrail assembly 10 comprises a plurality of handrail elements connected to each other by a plurality of handrail element connectors in accordance with several embodiments of the present disclosure. As detailed below, the handrail elements might comprise, for instance, extruded handrail elements, substantially tubular elements, handrail caps, or the like. The handrail elements might also be substantially longitudinal or curved or of any other shape. The handrail assembly 10 might be mounted, either directly or indirectly, to a support structure, such as, for instance, a wall and/or a ground surface. By combining the handrail elements are desired, it is possible to create handrail assemblies having various shapes and configurations which be adapted to the space in which the handrail assembly is placed and/or for the purpose of the handrail assembly.

It should be understood that even though the following description refers to the different connectors used to as "handrail connectors", the connectors can be shaped and dimensioned to connect together handrail and/or safety guardrail elements and/or to secure handrail and/or safety guardrail elements to a support structure and/or to a ground surface. Moreover, it is understood that the rail assembly 10 can comprise safety guardrails and/or handrails in any configuration and can be built with extruded rail elements, substantially tubular rail elements, bended portions, or any combination thereof.

In the embodiment shown in FIG. 1, the rail assembly 10 (or handrail assembly 10) comprises a substantially leveled handrail section 12 including two handrail portions which are angled relative to each other. The leveled handrail section 12 is configured to be installed on a substantially leveled ground surface. The handrail assembly 10 further comprises an inclined handrail section 14 which is angled downwardly from the leveled handrail section 12 and which is connected to the leveled handrail section 12 via a connecting handrail section 16. The inclined handrail section 14 may be shaped and dimensioned to substantially follow an inclination of stairs (not represented).

It will be understood that the configuration of the handrail assembly 10 illustrated in FIG. 1 is merely provided as an example, and that the handrail assembly 10 could instead have various other configurations. For example, instead of being secured to the floor, the handrail assembly could instead be secured to a wall, or could be secured both to a wall and a floor. In this case, the handrail assembly could be spaced away from the wall and substantially follow the wall.

Figure 2:
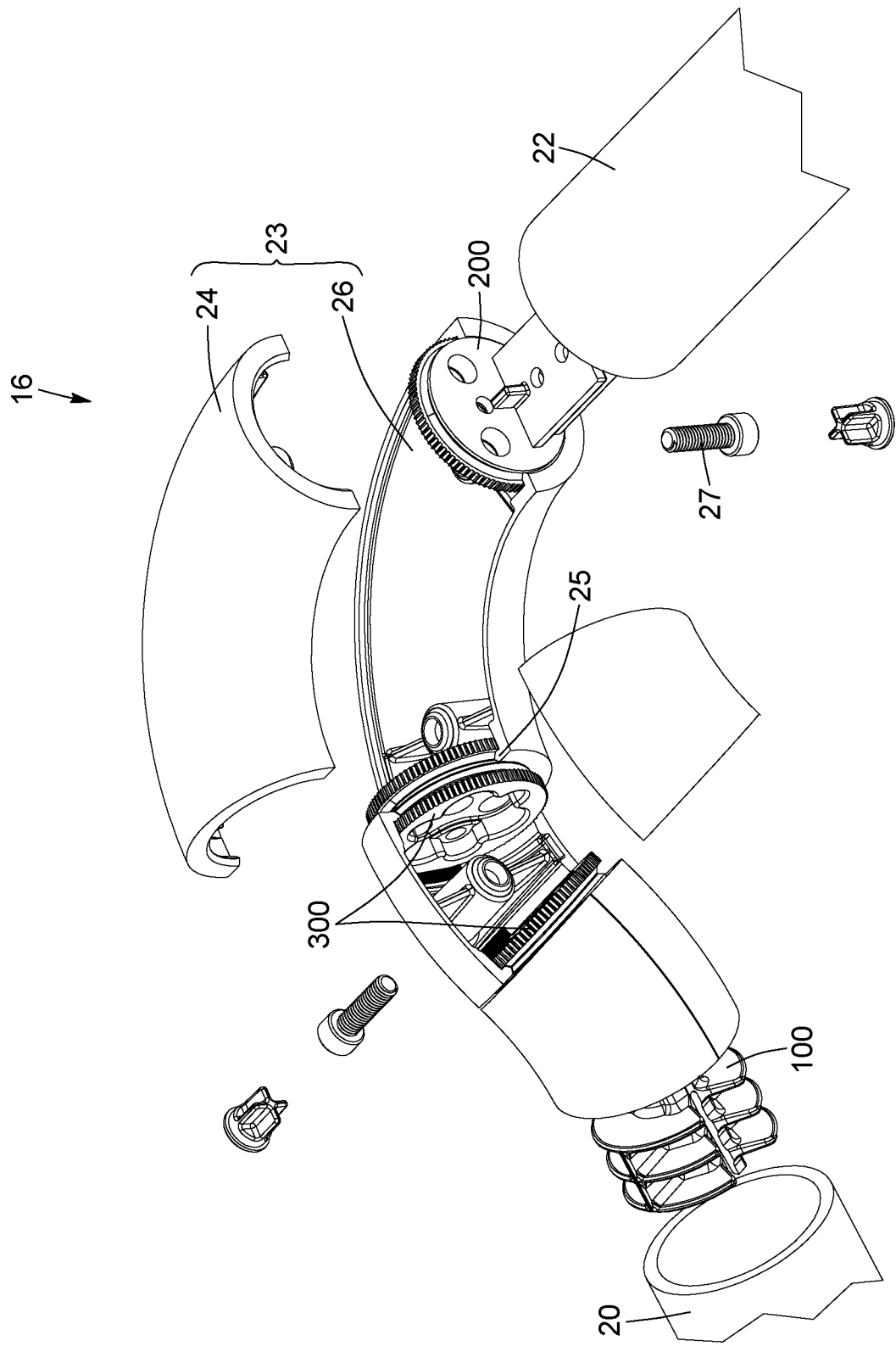
FIG. 2 is an enlarged top perspective view, partially exploded, of a handrail section of the handrail assembly of FIG. 1, the handrail section comprising a pipe-coupling handrail element connector, an extrusion-coupling handrail element connector and two disc-shaped handrail element connectors.
Figure 3:
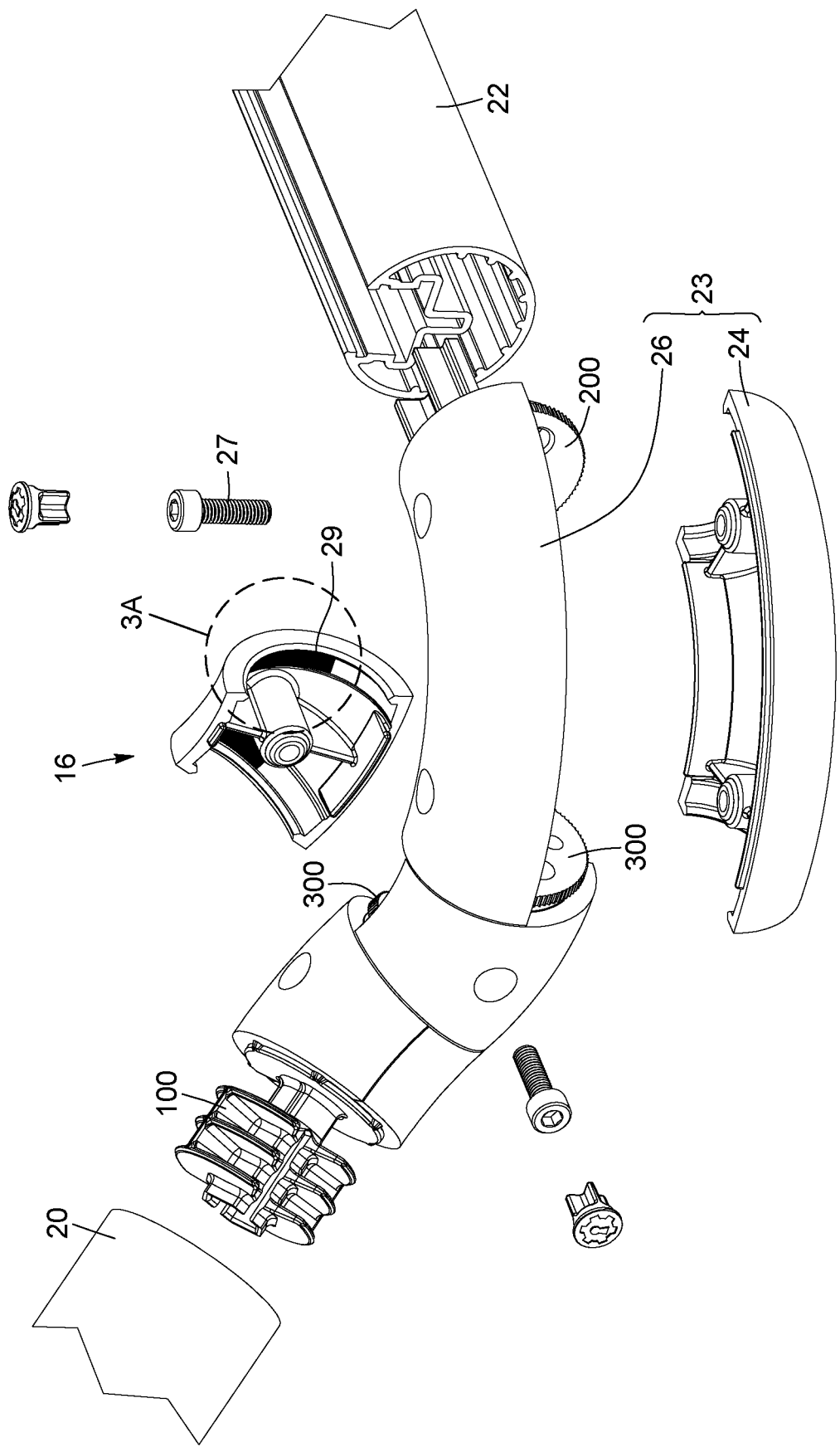
FIG. 3 is a bottom perspective view, partially exploded, of the handrail section of FIG. 2.

FIGS. 2 and 3 show an example of a handrail section (represented by the connecting handrail section 16 of the handrail assembly 10) configured in one possible configuration. The handrail assembly 10 includes different handrail elements of different types, shapes and/or dimensions, connected together using handrail element connectors. Specifically, the handrail section 16 comprises first and second straight handrail elements 20, 22 and a plurality of curved handrail elements 23 which are connected end-to-end between the first and second straight handrail elements 20, 22.

In the embodiment shown, the handrail section 16 comprises a substantially tubular handrail element 20 (or one-piece tubular handrail element 20) and an extruded handrail element 22. Specifically, the tubular handrail element 20 may include an existing, off-the-shelf tube or pipe of an appropriate size, while the extruded handrail element 22 may be specifically be configured to be used with a corresponding handrail element connector.

Still in the embodiment shown, each curved handrail element 23 includes lower and upper handrail portions 24, 26 which substantially define opposite halves of the curved handrail element 23 and which are connectable to each other using one or more mechanical fasteners 27 or any other connection means.

In this configuration, each handrail element is connected to at least one other handrail element using a corresponding handrail element connector which is sized and shaped in accordance with the handrail elements to be connected. As further described below, the handrail element connector could comprise one of a pipe-coupling handrail element connector 100 at least partially connectable to (or engageable with, or securable to) the one-piece tubular handrail element 20, an extrusion-coupling handrail element connector 200 at least partially connectable to (or engageable with, or securable to) the extruded handrail element 22, and disc-shaped handrail element connectors 300 at least partially connectable to (or engageable with, or securable to) handrail sections, such as, for instance, the lower and/or upper handrail portions 24, 26 of the two-piece curved handrail element 23.

As detailed below, the handrail element connectors 100, 200, 300 are shaped and dimensioned to connect (or secure, or engage) together handrail elements of different shapes and dimensions and to form therewith different handrail sections of the rail assembly. Specifically, each handrail element defines an internal cavity in which at least a portion of the handrail element connector 100, 200, 300 is received. When the handrail elements are assembled together by the corresponding handrail element connectors, the handrail element connectors are therefore at least partially contained within the handrail elements and may therefore be substantially hidden from view, so as to create a smooth continuity between the connected handrail elements.

The handrail element connectors 100, 200, 300 are further configured to prevent movement of the handrail elements once the handrail elements are connected via the handrail element connectors. Specifically, the handrail elements connectors are adapted to lock the handrail elements both in translation and in rotation relative to each other once the handrail elements have been aligned relative to each other in a desired position and orientation, and the handrail elements have been secured to the handrail elements connectors.

Figure 4:
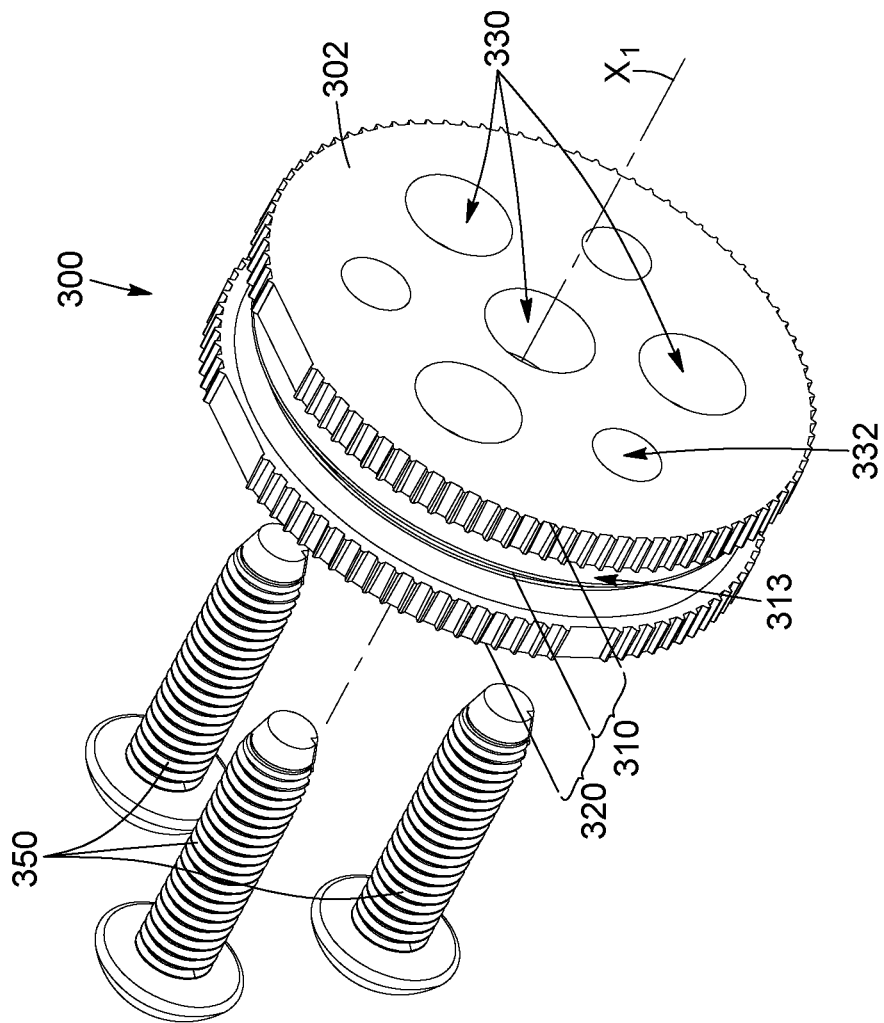
FIG. 4 is a first side perspective view of one of the disc-shaped handrail element connectors of FIG. 2.
Figure 5:
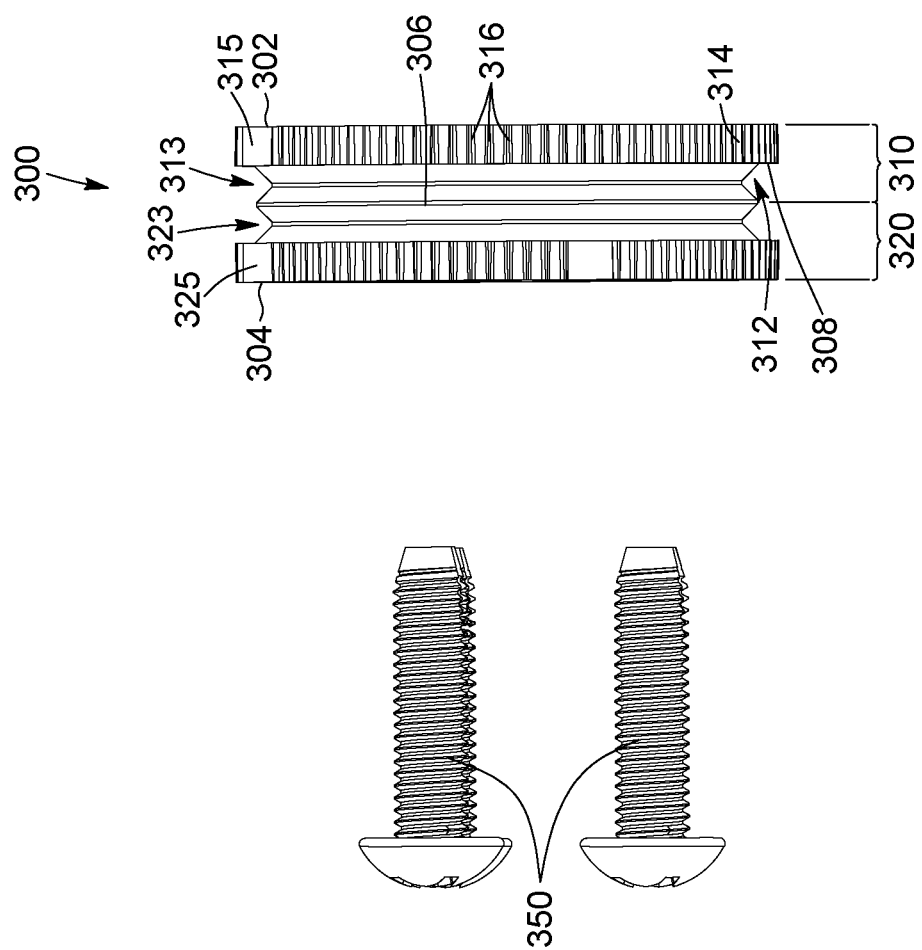
FIG. 5 is a side elevation view of the disc-shaped handrail element connector of FIG. 4.
Figure 6:
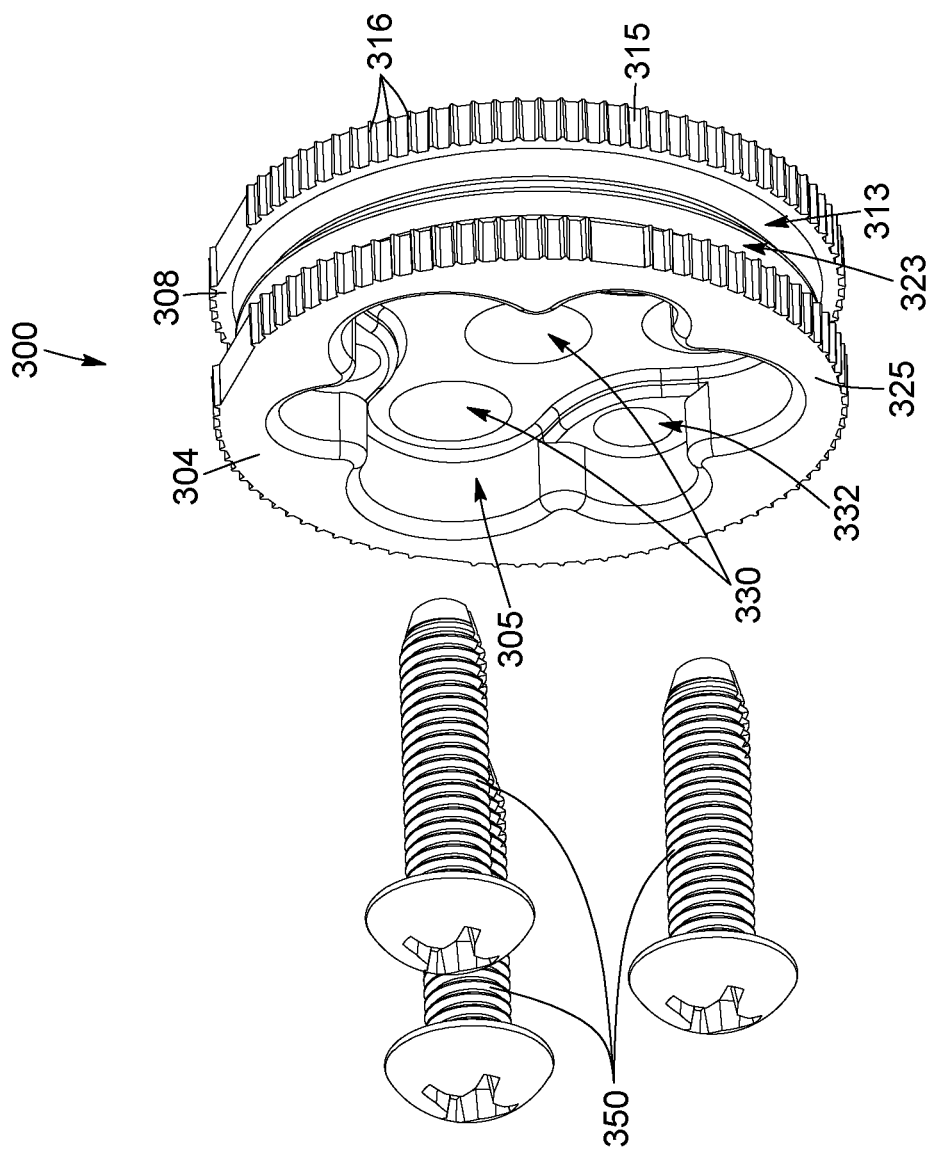
FIG. 6 is a second side perspective view of the disc-shaped handrail element connector of FIG. 4.

FIGS. 4 to 6 represent a possible embodiment of the disc-shaped handrail element connector 300 (or coupling disc 300). The disc-shaped handrail element connector 300 has a connector axis $X_1$ and comprises first and second opposed faces 302, 304 (or first and second opposed sides 302, 304).

In the embodiment shown, the disc-shaped handrail element connector 300 is substantially cylindrical and the first and second faces 302, 304 are substantially circular. Alternatively, the handrail element connector 300 could have another configuration.

The disc-shaped handrail element connector 300 comprises first and second opposed connecting portions 310, 320. As detailed below, the first and second opposed connecting portions 310, 320 are substantially positioned back-to-back to each other to connect two handrail elements in an end-to-end configuration or to connect a handrail element to a support structure, such as a wall. More specifically, the disc-shaped handrail element connector 300 has a central symmetry plane extending transversally (for instance substantially perpendicularly) to the connector axis $X_1$, as shown in FIG. 5. The first and second connecting portions 310, 320 have thus substantially similar shapes and dimensions so that the following description of the first connecting portion 310 will also apply, unless otherwise stated, to the second connecting portion 320.

In the embodiment shown, the first connecting portion 310 comprises one or more axial coupling portion or axial couplers 312 couplable axially (with respect to the connector axis $X_1$) to a corresponding handrail element axial coupling portion located in a first handrail element internal cavity of a first handrail element; and angular coupling portions or angular couplers 314 couplable angularly (with respect to a rotation about the connector axis $X_1$) to a corresponding handrail element angular coupling portion also located in the first handrail element internal cavity of the first handrail element.

In the embodiment shown, the handrail element connector 300 has a connector body 306 and the axial coupler 312 comprises a coupling groove 313 (or connecting groove 313) extending along at least a portion of an outer periphery of the connector body 306 (along substantially the entire circumference of the connector body 306, in the embodiment shown). In the embodiment shown, the coupling groove 313 has a substantially V-shaped cross-section as best shown in FIG. 5. Alternatively, the coupling groove 313 could have a semi-circular cross-section or have a cross-section having any other shape.

The first connecting portion 310 further comprises a coupling flange 315 (or toothed ring 315) defining a first free end portion of the handrail element connector 300, substantially adjacent the coupling groove 313. In the embodiment shown, the coupling flange 315 has an outer cross-section greater than an outer cross-section of the connector body 306, such that a first abutting surface 308 is formed between the connector body 306 and the coupling flange 315. The axial couplers 312 of the first connecting portion 310 thus further comprise the first abutting surface 308.

The angular couplers 314 comprise a plurality of coupling teeth 316 formed on an outer periphery of the coupling flange 315. Specifically, the coupling teeth extend substantially radially away from the connector axis $X_1$. In the embodiment shown, the coupling flange 315 is configured substantially as a spur gear such that edges of the coupling teeth 316 extend along a substantially linear axis, substantially parallel to each other, and along a direction substantially parallel to the connector axis $X_1$. Alternatively, the coupling flange 315 could be configured such that the edges of the coupling teeth 316 are substantially angled relative to the connector axis $X_1$. In yet another embodiment, the edges of the coupling teeth 316 may not extend along a linear axis and could instead be shaped according to any shape that a skilled person would consider to be suitable.

Still in the embodiment shown, each tooth substantially tapers away, i.e. its width decreases, from the connector's central symmetry plane towards the corresponding one of the first and second opposed faces 302, 304. Alternatively, the teeth may not be tapered.

As best shown in FIGS. 4 and 5, the coupling teeth 316 are spaced apart from each other. In the illustrated embodiment, the coupling teeth 316 are regularly spaced apart from each other. It will be understood that since the coupling teeth 316 are spaced from each other and are also extend radially away from the connector axis $X_1$, the coupling teeth 316 are further angled away from each other at regular intervals. For example, the coupling teeth 316 could be angled away from each other by an angle of 2 degrees. Alternatively, the coupling teeth 316 could be angled away from each other by an angle of 1 degree. In another embodiment, the coupling teeth 316 could instead be angled away from each other by a different angle. In yet another embodiment, the coupling teeth could instead be spaced away from each other and angled away from each other at irregular intervals.

The coupling teeth 316 are formed on at least a portion of the outer periphery of the coupling flange 315. In the embodiment shown, the outer periphery of the coupling flange 315 comprises one or more teeth-free portions. Alternatively, the coupling teeth 316 could instead be formed substantially on an entirety of the outer periphery of the coupling flange.

As shown in FIG. 2, the corresponding axial coupling portion defined in the handrail element comprises a coupling lip 25—or inner lip 25—protruding substantially radially inwardly from an inner surface thereof. The coupling lip 25 is shaped and dimensioned to be at least partially received in the coupling groove 313 of the connector 300. In the embodiment illustrated in FIG. 2, the coupling lip 25 of one of the curved handrail elements 23 extends substantially along an entire circumference of the curved handrail element 23 and is configured for engaging the coupling groove 313 of the connector 300 along substantially an entire circumference of the connector 300. Alternatively, the coupling lip 25 could instead extend along only a portion of the circumference of the curved handrail element 23 and engage only a corresponding portion of the coupling groove 313.

It is thus understood that, when the handrail element connector 300 and the first handrail element are engaged with each other (i.e. when at least the first connecting portion 310 of the disc-shaped handrail element connector 300 is at least partially surrounded by the first handrail element), the first connecting portion 310 is axially coupled to the first handrail element, via the cooperation of the coupling lip 25 with the coupling groove 313 and the first abutting surface 308. In other words, the axial couplers 312 of the first connecting portion 310 form axial blockers shaped and dimensioned to prevent axial movement, i.e. along a direction substantially parallel to the connector axis $X_1$, of the handrail element connector 300 and the first handrail element relative to each other.

Figure 3A:
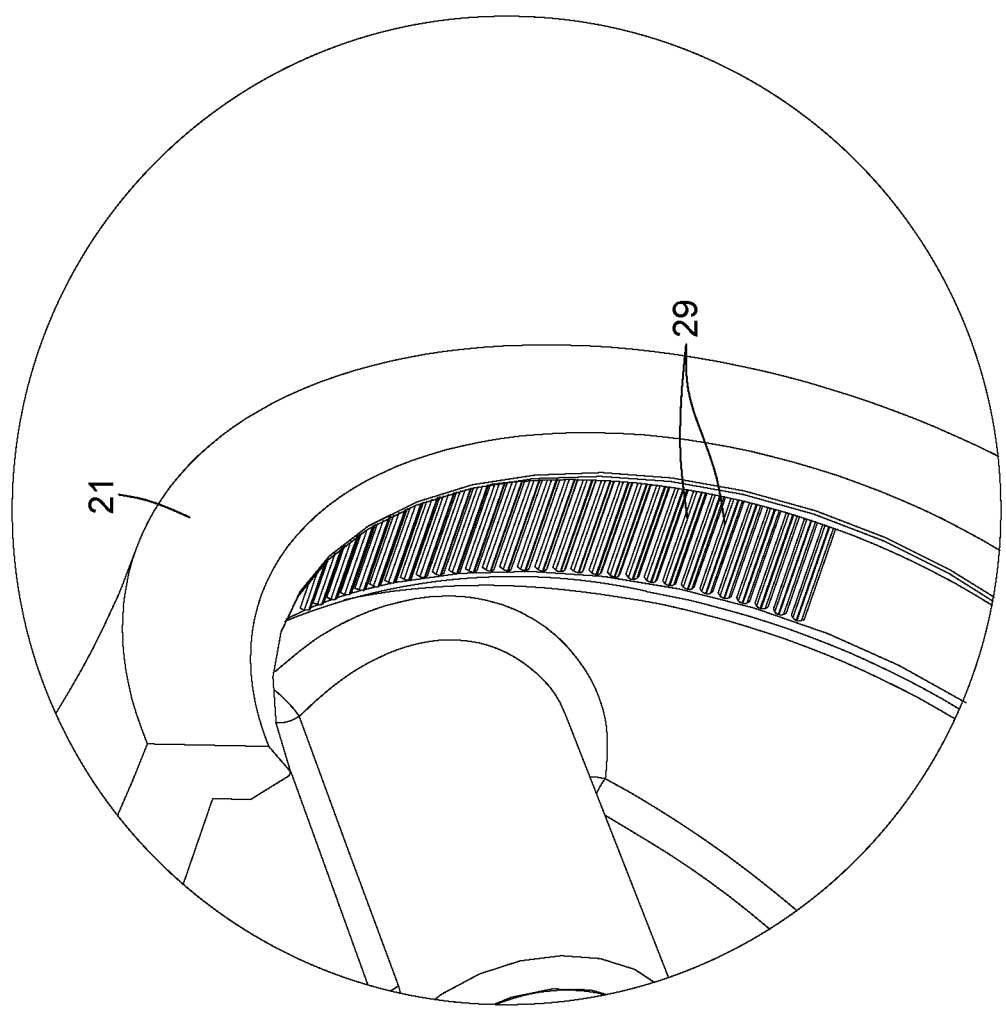
FIG. 3A is an enlarged view of a handrail element of the handrail section of FIG. 3.

Moreover, the corresponding angular coupling portion defined in the handrail element comprises complementary coupling teeth 29 or coupling bumps 29 (see FIGS. 3 and 3A) which are formed on the inner surface of the handrail element. The complementary coupling teeth 29 extend along a direction substantially parallel to the connector axis $X_1$ when the corresponding handrail element and the handrail element connector 300 are connected to each other. As represented for instance in FIG. 3A, the coupling teeth 29 of the handrail element 21 are shaped and dimensioned to cooperate, i.e. mesh, with at least some of the coupling teeth 316 of the first connecting portion 310 to thereby lock the connector 300 in rotation with the handrail element 21.

It is thus understood that, when the handrail element connector 300 and the first handrail element engage each other (i.e. when at least the first connecting portion 310 is received in the handrail element's internal cavity and at least partially surrounded by the first handrail element), the first connecting portion 310 is angularly coupled to the first handrail element, via the cooperation of the coupling teeth of the handrail element connector and of the first handrail element. In other words, the angular couplers 314 of the first connecting portion 310 form tangential blockers shaped and dimensioned to prevent rotation of the handrail element connector 300 and the first handrail element relative to each other.

In the embodiment shown, the engagement of the disc-shaped handrail element connector 300 with the two-piece handrail element 23 comprises engaging the disc-shaped handrail element connector 300 with a first one of the two handrail portions 24, 26 (for instance, engaging the coupling groove 313 with the inner lip 25 formed on the inner surface of the first one of the two handrail portions 24, 26 and/or engaging the coupling flange 315 with the coupling teeth 29 formed on the inner surface of the first one of the two handrail portions 24, 26). The second one of two handrail portions 24, 26 is further engaged with the combination of the disc-shaped handrail connector 300 and the first one of the two handrail portions 24, 26. The two handrail portions 24, 26 are then secured to each other (for instance via the mechanical fastener 27) so as to form the two-piece handrail element 23, the disc-shaped handrail element connector 300 being sandwiched between the two handrail portions 24, 26. In this configuration, axial movement of the connector 300 towards or away from the handrail element 23 is therefore prevented.

Since the connector 300 is symmetrical about a central plane of symmetry as explained above, the disc-shaped handrail connector 300 thus comprises two adjacent coupling grooves 313, 323 (for instance two adjacent V-shaped coupling grooves) positioned side-by-side between two coupling flanges 315, 325, so that the disc-shaped handrail connector 300 is shaped and dimensioned to connect together two handrail elements having similar corresponding axial and angular coupling portions.

In the embodiment shown, the disc-shaped handrail element connector 300 further comprises at least one fastener-receiving through openings 330 that are untapped. The fastener-receiving through openings 330 are shaped and dimensioned to receive corresponding connector fasteners 350 and to allow the connector fasteners 350 to pass therethrough. More specifically, in the embodiment shown, the fastener-receiving through openings 330 includes four first fastener-receiving through openings, i.e. a central fastener-receiving through opening and three fastener-receiving through openings disposed around the central fastener-receiving through opening. Alternatively, the fastener-receiving through openings 330 could include a single fastener-receiving through opening or more or less than four fastener-receiving through openings, and could be disposed according to any other arrangement on the disc-shaped handrail element connector 300.

In the embodiment shown, the connector fasteners 350 comprise screws, but handrail element connectors receiving any other mechanical fasteners could be conceived. The fastener-receiving through openings 330 are thus configured, for instance, to mount the first handrail element with the disc-shaped handrail element connector 300 engaged therewith to a support structure such as a wall or any other type of support structure.

In the embodiment shown, the disc-shaped handrail element connector 300 further comprises one or more fastener-engaging apertures 332 which could be pre-tapped for receiving corresponding fasteners or which could be shaped and dimensioned to be tapped by self-tapping fasteners. In the embodiment shown, the one or more fastener-engaging apertures 332 include three fastener-engaging apertures 332 which are disposed around the central fastener-receiving through opening 330 and which have a substantially smaller diameter than the fastener-receiving through openings 330. Alternatively, the fastener-engaging apertures 332 could include more or less than three fastener-engaging apertures 332 and may be disposed according to any other arrangement on the disc-shaped handrail element connector 300.

Depending on the configuration of the element or structure to which the disc-shaped handrail element connector 300 is secured, the fastener-receiving through opening 330 and/or the fastener-engaging apertures 332 could receive corresponding fasteners to secure the disc-shaped handrail element connector 300 to the element or structure. It will be understood that the fastener-receiving through opening 330 and/or the fastener-engaging apertures 332 which do not receive a fastener could be used to introduce cables (such as for instance electric cables or wires) within the first handrail element having the disc-shaped handrail element connector 300 engaged therewith. For instance, the disc-shaped handrail element connector 300 and/or the cable-receiving through openings 332 could be shaped and dimensioned to receive cables which can provide lighting— such as a LED lighting (not represented)—into the first handrail element.

It will be understood that in another embodiment, the disc-shaped handrail element connector 300 may not include any fastener-receiving through openings 330 and/or any fastener-engaging apertures 332.

In the embodiment shown, the first face 302 (or first side 302) is substantially planar, whereas a fastener-receiving recess 305 is formed in the second face 304 (or second side 304). The fastener-receiving recess 305 may for instance be shaped to at least partially receive screw heads or any other portion of mechanical fasteners at least partially received in the fastener-receiving through openings 330. It could also be conceived a disc-shaped handrail element connector wherein the first and second faces would be substantially similar.

It will be appreciated that the shape and the configuration of the disc-shaped handrail element connector 300 can vary from the embodiment shown. For instance, the shape, the configuration and/or the location of the angular and axial couplers, as well as the shape, the configuration, the location and/or the number of the fastener-receiving through openings and the cable-receiving apertures can vary from the embodiment shown.

Figure 7:
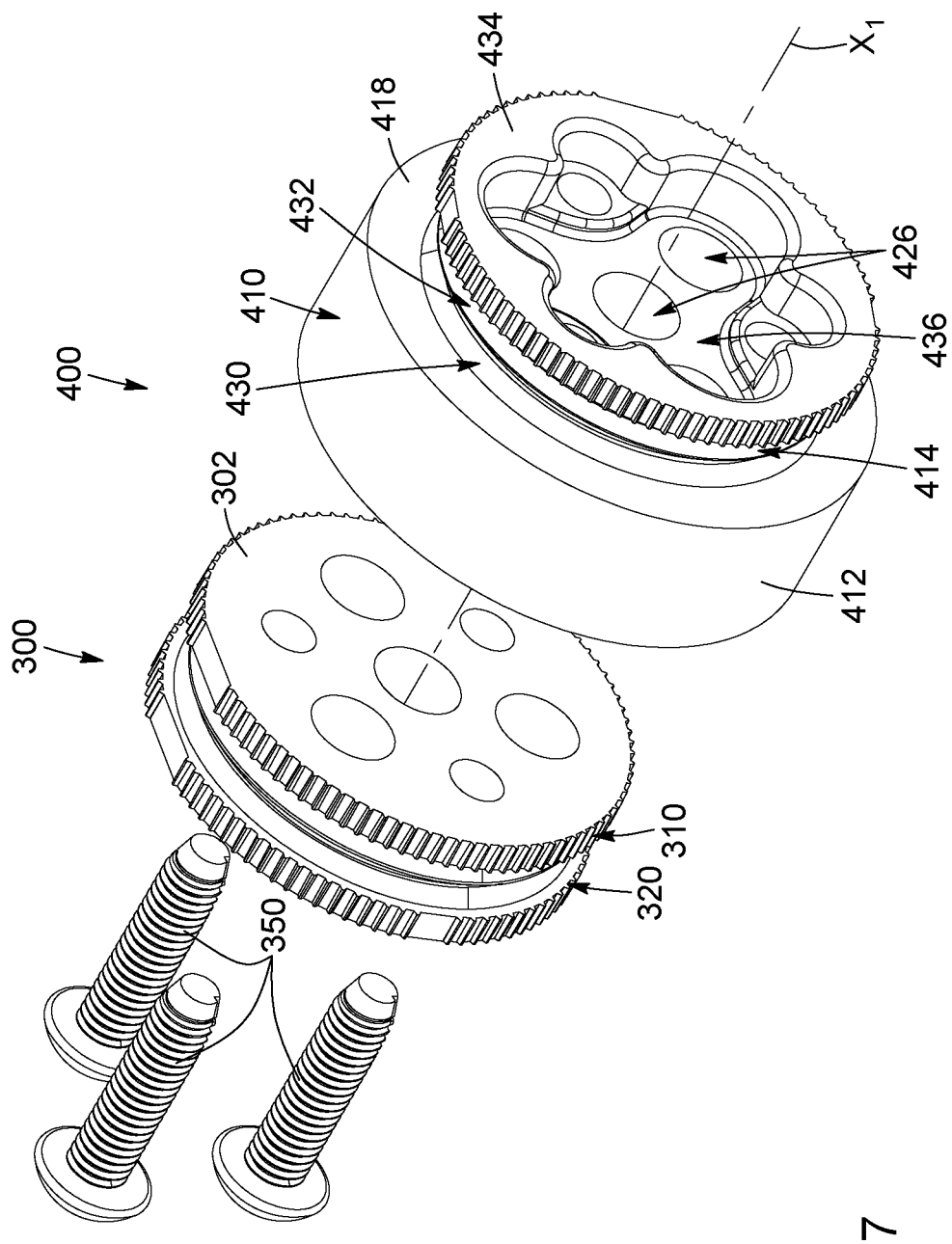
FIG. 7 is a first side perspective view, exploded, of a handrail spacing assembly comprising a spacing handrail element connector and the disc-shaped connector of FIG. 4.
Figure 8:
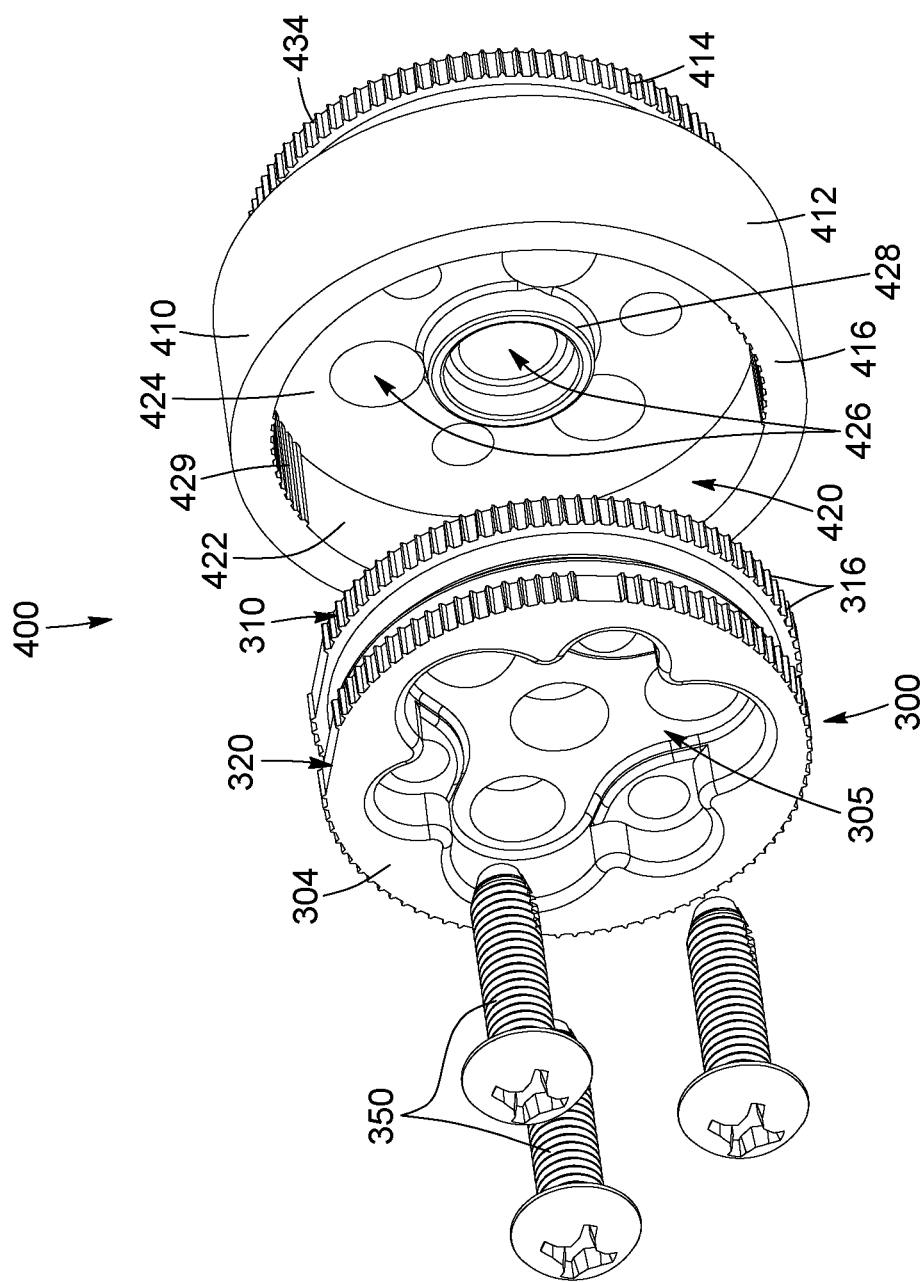
FIG. 8 is a second side perspective view, exploded, of the handrail spacing assembly of FIG. 7.
Figure 9:
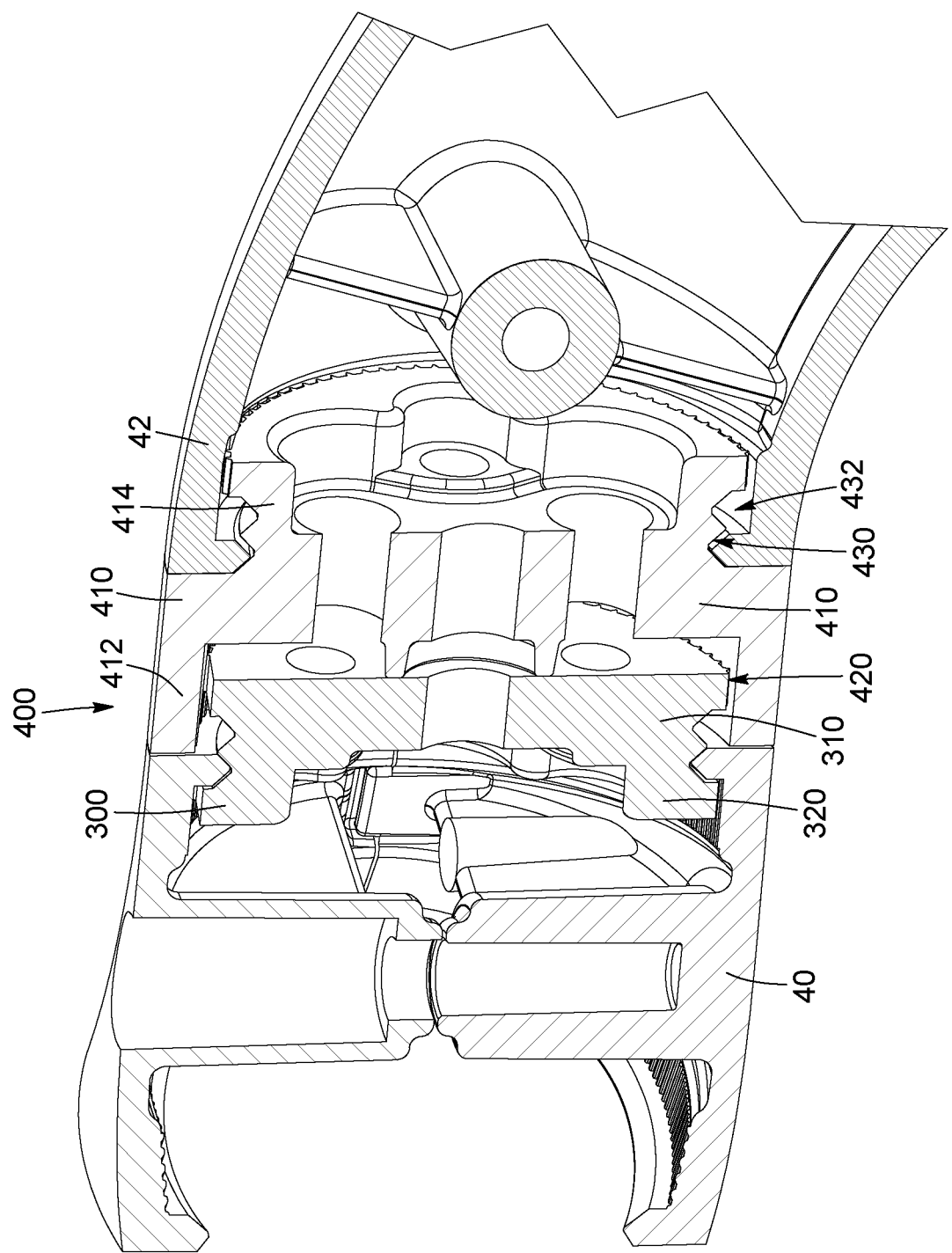
FIG. 9 is a cross-section view of a handrail section of the handrail assembly of FIG. 1 comprising first and second handrail elements connected to each other by the handrail spacing assembly of FIG. 7.

As represented in FIGS. 7 to 9, the present disclosure also concerns a handrail spacing assembly 400 comprising a spacing handrail element connector 410 which can be used with a handrail element connector such as the above-described disc-shaped handrail element connector 300. The spacing assembly 400 is adapted to engage the connector 300 to substantially extend the length of the connector 300, as will be explained below.

In the embodiment shown, the spacing handrail element connector 410 is substantially cylindrical in shape and comprises a spacing body 412 and a spacing connector connecting portion 414. The spacing body 412 has a first face 416 and an opposed second face 418 from which extends the connecting portion 414. A connector-receiving cavity 420 is formed in the spacing body 412 for receiving at least a portion of the connector 300. Specifically, the connector-receiving cavity 420 opens in the first face 416. The connector-receiving cavity 420 is substantially cylindrical in shape and is at least partially delimited by an inner surface 422 of the spacing body 412. When the connector 300 is at least partially received in the cavity 420, the spacing handrail element connector 410 is substantially coaxial with the disc-shaped handrail element connector 300.

The spacing body 412 further comprises a bottom wall portion 424 extending substantially transversally to the connector axis $X_1$ and substantially parallel to the first and second faces 416, 418. In the embodiment shown, the bottom wall portion 424 extends substantially perpendicularly to a peripheral wall portion of the spacing body 412 and at least partially delimits the connector-receiving cavity 420. Through-openings 426 are formed in the bottom wall portion 424 that are in register with at least some of the fastener-receiving through openings 330 and the cable-receiving apertures 332 of the disc-shaped handrail element connector 300 when engaged therewith (i.e. when the disc-shaped handrail element connector 300 is at least partially received in the connector-receiving cavity 420). In other words, the connector-receiving cavity 420 is shaped and dimensioned so that the inner surface 422 of the spacing body 412 at least partially surrounds the disc-shaped handrail element connector 300 when engaged therein. Moreover, as represented in FIG. 8, coupling teeth 429 (or coupling bumps 429) are formed on the inner surface 422 that are shaped and dimensioned to cooperate with the coupling teeth 316 of the disc-shaped handrail element connector 300 so as to angularly couple the spacing handrail element connector 410 and the disc-shaped handrail element connector 300 when engaged together. In the illustrated embodiment, the coupling teeth 429 are only defined along a portion of a circumference of the inner surface 422. Alternatively, the coupling teeth 429 could be defined along the entire circumference of the inner surface 422.

In the embodiment shown, the spacing body 412 further comprises an inner spacing ring 428 protruding from the bottom wall portion 424 into the connector-receiving cavity 420. The inner spacing ring 428 is configured to prevent the first face 302 of the disc-shaped handrail element connector 300 from abutting against the bottom wall portion 424 when the disc-shaped handrail element connector 300 is engaged in the connector-receiving cavity 420 as shown in FIGS. 7-9. i.e. when the first face 302 faces towards the spacing body 412 and the second face 304 faces away from the spacing body 412. More specifically, the inner spacing ring 428 is shaped and dimensioned so that the second connecting portion 320 of the handrail element connector 300 protrudes outwardly from the connector-receiving cavity 420 when the handrail element connector 300 is engaged therein.

The disc-shaped handrail element connector 300 could instead engage the spacing body 412 in another configuration, not shown, in which the second face 304 faces towards the spacing body 412 and the first face 302 faces away from the spacing body 412. The inner spacing ring 428 may further be shaped and dimensioned such that in this configuration, the inner spacing ring 428 is fully received in the fastener-receiving recess 305 defined in the second face 304 of the connector 300 such that the second face 304 contacts the bottom wall portion 424 of the spacing body 412. Alternatively, the spacing body 412 may not include an inner spacing ring 428.

The connecting portion 414 of the spacing handrail element connector 410 comprises first and second coupling grooves 430, 432 having a V-shaped cross-section substantially similar to the coupling groove 313 of the first connecting portion 310 of the handrail element connector 300, and a spacing connector coupling flange 434 (or toothed ring 434) forming a free end portion of the spacing handrail element connector 410 opposed to the first face 416 thereof. In the embodiment shown, the coupling flange 434 is substantially similar to the coupling flange 315 of the first connecting portion 310 of the handrail element connector 300 and comprises a plurality of coupling teeth formed on an outer periphery thereof. A recess 436 is further formed in the coupling flange 434. This recess 436 may be substantially similar to the fastener-receiving recess 305 of the connector 300 and may serve for the same purpose as the fastener-receiving recess 305. The recess 436 may further be sized and dimensioned such that when the spacing handrail element connector 410 is stacked into another, similar spacing handrail element connector, the inner spacing ring 428 of the other spacing handrail element connector may be fully received in the recess 436 formed in the coupling flange 434 to allow the coupling flange 434 to contact the bottom wall portion 424 of the other handrail element connector.

It is thus understood that, when the handrail element connector 300 and the spacing handrail element connector 410 are connected to each other (i.e. when one of the first and second connecting portions 310, 320 of the handrail element connector 300 is engaged in the connector-receiving cavity 420 of the spacing handrail element connector 410), the handrail spacing assembly 400 comprises first and second connecting portions formed respectively by the other one of the first and second connecting portions 310, 320 of the disc-shaped handrail element connector 300 and by the connecting portion 414 of the spacing handrail element connector 410. As best shown in FIG. 9, this allows the handrail spacing assembly 400 to connect together first and second handrail elements 40, 42. More particularly, in the embodiment shown, the second connecting portion 320 of the disc-shaped handrail element connector 300 is angularly and axially coupled to the first handrail element 40, while the connecting portion 414 of the spacing handrail element connector 410 is axially and angularly coupled to the second handrail element 42. The first connecting portion 310 of the disc-shaped handrail element connector 300 is at least partially received in the connector-receiving cavity 420 of the spacing handrail element connector 410. As represented in FIG. 9, the handrail spacing assembly 400 thus allows connecting together the first and second handrail elements 40, 42 in a spaced-apart configuration. The distance between the connected first and second handrail elements 40, 42 is determined in particular by the dimensions of the spacing body 412 of the spacing handrail element connector 410. At least some of the above-mentioned connector fasteners (not represented in FIG. 9) can be configured to assemble together the disc-shaped handrail element connector 300 and the spacing handrail element connector 410.

As mentioned above, in the embodiment shown, the spacing handrail element connector 410 is shaped and dimensioned to be stacked with one or more similar spacing handrail element connectors. When stacked together, the plurality of spacing handrail element connectors 410 can be connected to each other for instance via mechanical fasteners engaged in at least some of the through-openings 426 formed in the bottom wall portion 424. Moreover, the distance between the first and second handrail elements connected by the handrail spacing assembly 400 depends on the number and dimensions of the plurality of the spacing handrail element connectors 410 configured in the stacked configuration.

Moreover, the handrail spacing assembly 400 could also be used to attach (or mount, or secure) the second handrail element 42 to a support structure such as a wall via fasteners engaged in at least some of the fastener-receiving through openings 330 of the disc-shaped handrail element connector 300 and corresponding ones of the through-openings 426 of the spacing handrail element connector 410.

It is appreciated that the shape and the configuration of the handrail spacing assembly 400 can vary from the embodiment shown. For instance, the shape, the configuration and/or the location of the spacing body 412 and the connecting portion 414 of the spacing handrail element connector 410, as well as the shape, configuration and/or number of spacing handrail element connectors configured in a stacked configuration and forming together the handrail spacing assembly can vary from the embodiment shown.

For instance, even if in the embodiment shown, the spacing handrail element connector is shaped and dimensioned to cooperate with a disc-shaped handrail element connector, it could easily be conceived handrail spacing assemblies comprising one or more spacing handrail element connectors shaped and dimensioned to cooperate with any one of the different disclosed embodiments of handrail element connectors.

Figure 10:
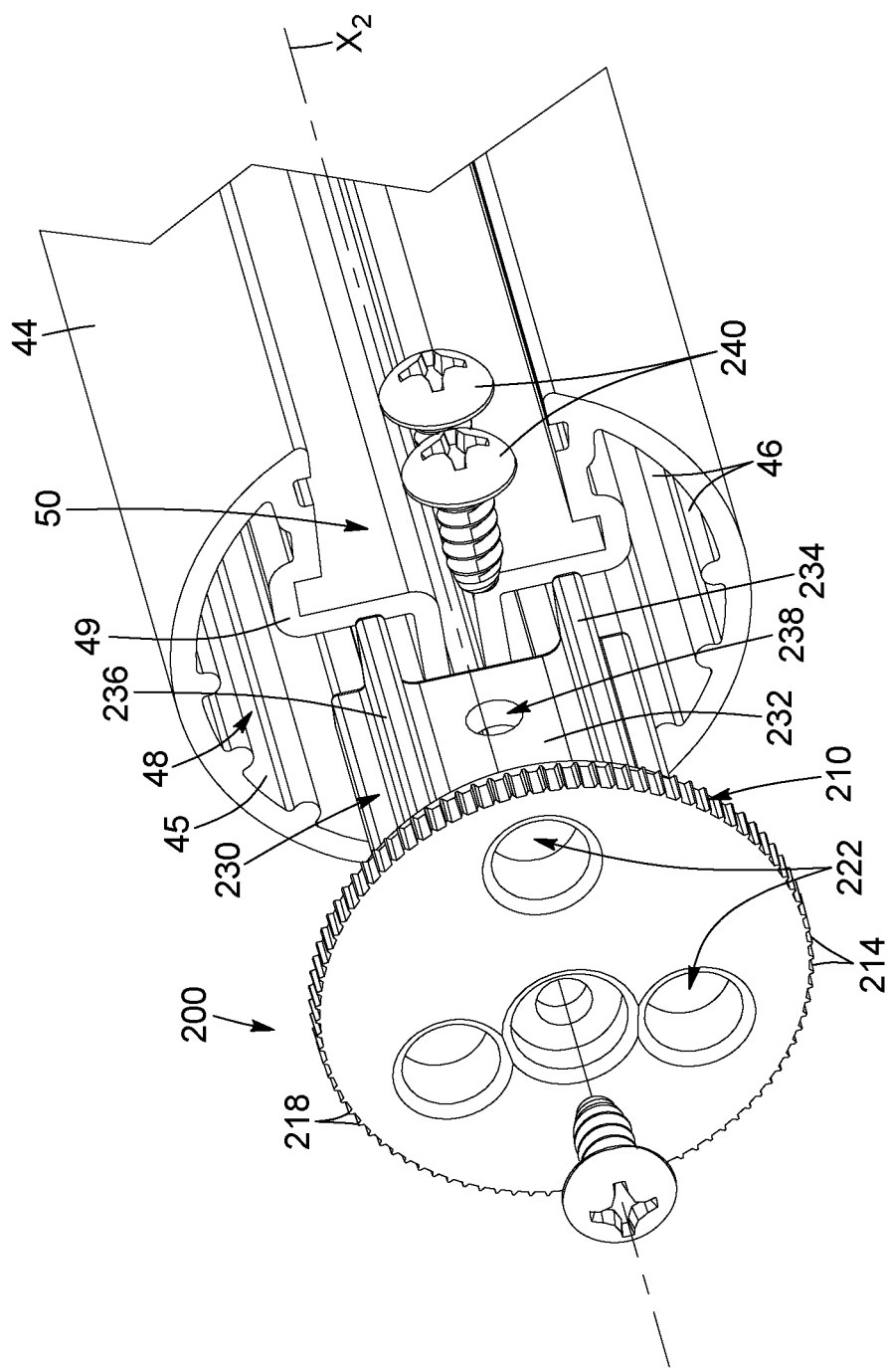
FIG. 10 is a bottom perspective view, exploded, of a handrail section of the handrail assembly of FIG. 1, the handrail section comprising an extruded handrail element and the extrusion-coupling handrail element connector of FIG. 2.
Figure 11:
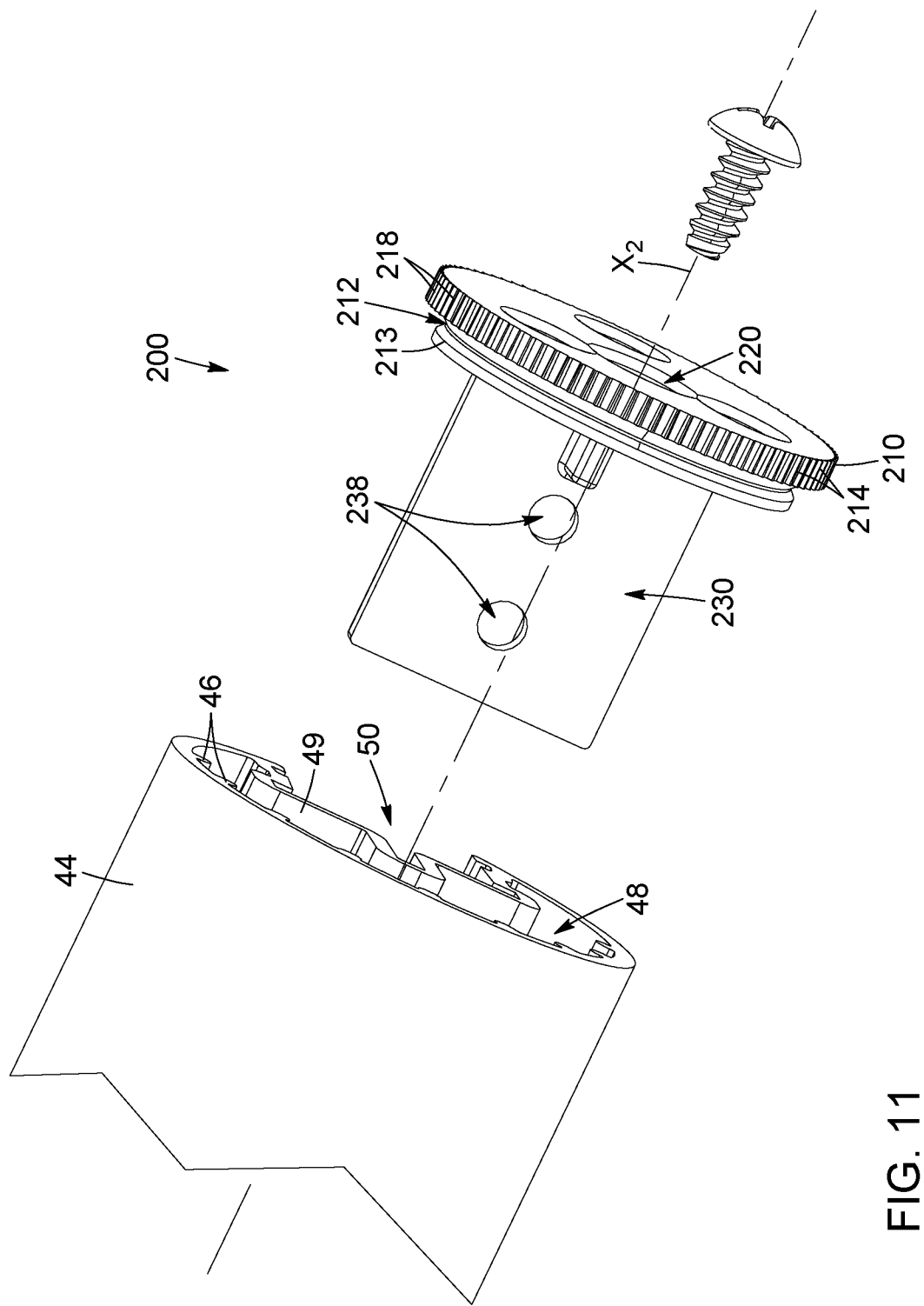
FIG. 11 is a top perspective view, exploded, of the handrail section of FIG. 10.

FIGS. 10 and 11 represent another possible embodiment of the handrail element connector in accordance with the present disclosure.

The extrusion-coupling handrail element connector 200 is shaped and dimensioned to be coupled (angularly and/or axially) to an extruded handrail element 44 (i.e. a handrail element at least partially made by extrusion so as to form a specific cross-section).

As represented in FIGS. 10 and 11, the extruded handrail element 44 comprises, in the embodiment shown, an inner surface 45 with longitudinal protrusions 46 protruding inwardly therefrom. The longitudinal protrusions 46 extend substantially parallel to each other along a longitudinal direction of the handrail element. The extruded handrail element 44 defines an inner handrail cavity 48 at least partially delimited by the inner surface 45 and by a longitudinal extruded inner separation wall 49 which is configured to at least partially define a connector-receiving channel 50.

It is appreciated that the shape and the configuration of the extruded handrail element 44, in particular the shape, the configuration, the location and/or the number of the longitudinal protrusions 46, the longitudinal inner separation wall 49 and the connector-receiving channel 50 can vary from the embodiment shown.

The extrusion-coupling handrail element connector 200 comprises, substantially similarly to the above-described disc-shaped handrail element connector 300, a connector axis $X_2$, substantially parallel to the longitudinal axis of the extruded handrail element 44 when engaged therewith, and a first connecting portion 210. Similarly to the disc-shaped handrail element connector 300, the first connecting portion 210 of the extrusion-coupling handrail element connector 200 has one or more axial couplers 212 axially couplable to an inner surface of a first handrail element (for instance to an inner lip thereof; not represented in FIGS. 10 and 11) and one or more angular couplers 214 angularly couplable to the inner surface of the first handrail element (not represented).

The axial couplers 212 comprise one or more coupling grooves or connecting grooves extending along at least a portion of an outer periphery of a first connector body 213. In the embodiment shown, the axial couplers 212 comprise a single coupling groove which extends substantially along the entire circumference of the first connector body 213. Still in the embodiment shown, the coupling groove has a substantially V-shaped cross-section.

The first connecting portion 210 further comprises a coupling flange 216 (or toothed ring 216). In the embodiment shown, the coupling flange 216 defines a first free end portion of the extrusion-coupling handrail element connector 200 and shaped and dimensioned to be at least partially surrounded by the first handrail element. The angular couplers 214 comprise a plurality of coupling teeth 218 formed on an outer periphery of the coupling flange 216. In the embodiment shown, and similarly to the above-described disc-shaped handrail element connector 300, at least a fastener-receiving through opening 220 and one or more cable-receiving apertures 222 (or wire-receiving through openings 222) are formed in the coupling flange 216.

The extrusion-coupling handrail element connector 200 further comprises an extrusion-coupling end portion 230. In the embodiment shown, the extrusion-coupling end portion 230 extends transversally (for instance substantially perpendicularly) from the first connector body 213 (i.e. substantially parallel to the connector axis $X_2$ of the extrusion-coupling handrail element connector 200). The extrusion-coupling end portion 230 is shaped and dimensioned to substantially conform to the connector-receiving channel 50 of the extruded handrail element 44. For instance, in the embodiment shown, the extrusion-coupling end portion 230 comprises an extrusion-coupling plate 232 and two extrusion-coupling tabs 234, 236 secured to an inner surface of the extrusion-coupling plate 232 and protruding substantially perpendicularly therefrom. In other words, the extrusion-coupling end portion 230 has a substantially U-shaped cross-section to at least partially engage the extrusion-coupling end portion 230 in the connector-receiving channel 50. One or more fastener-receiving openings 238 are formed in the extrusion-coupling end portion 230 (for instance in the extrusion-coupling plate 232 in the embodiment shown) that are configured to receive mechanical fasteners 240 (for instance self-tapping screws) in order to further secure the extrusion-coupling handrail element connector 200 to the extruded handrail element 44 when the extrusion-coupling end portion 230 is at least partially engaged therewith. The mating shapes and dimensions of the connector-receiving channel 50 and the extrusion-coupling end portion 230 ensures an angular coupling of the extrusion-coupling handrail element connector 200 and the extruded handrail element 44 upon rotation about the connector axis $X_2$, whereas the snug fit of the extrusion-coupling end portion 230 and the connector-receiving channel 50, possibly combined with the mechanical fasteners 240 engaged in the fastener-receiving openings 238, ensures an axial coupling (considered along a direction substantially parallel to the connector axis $X_2$) of the extrusion-coupling handrail element connector 200 and the extruded handrail element 44.

It is thus understood that the extrusion-coupling handrail element connector 200 makes it possible to connect together different types of handrail elements, such as for instance a handrail element having an inner lip (as the ones connected by the above-described disc-shaped handrail element connector) and an extruded handrail element. The extrusion-coupling handrail element connector 200 is further shaped and dimensioned to at least one of angularly and axially couple together the two connected handrail elements.

It is appreciated that the shape and the configuration of the extrusion-coupling handrail element connector 200 can vary from the embodiment shown. For instance, the shape, the configuration and/or the location of the first connecting portion, the angular and axial couplers thereof, the extrusion-coupling end portion, the extrusion-coupling plate and the extrusion-coupling tabs thereof and the fastener-receiving openings formed therein can vary from the embodiment shown.

Figure 12:
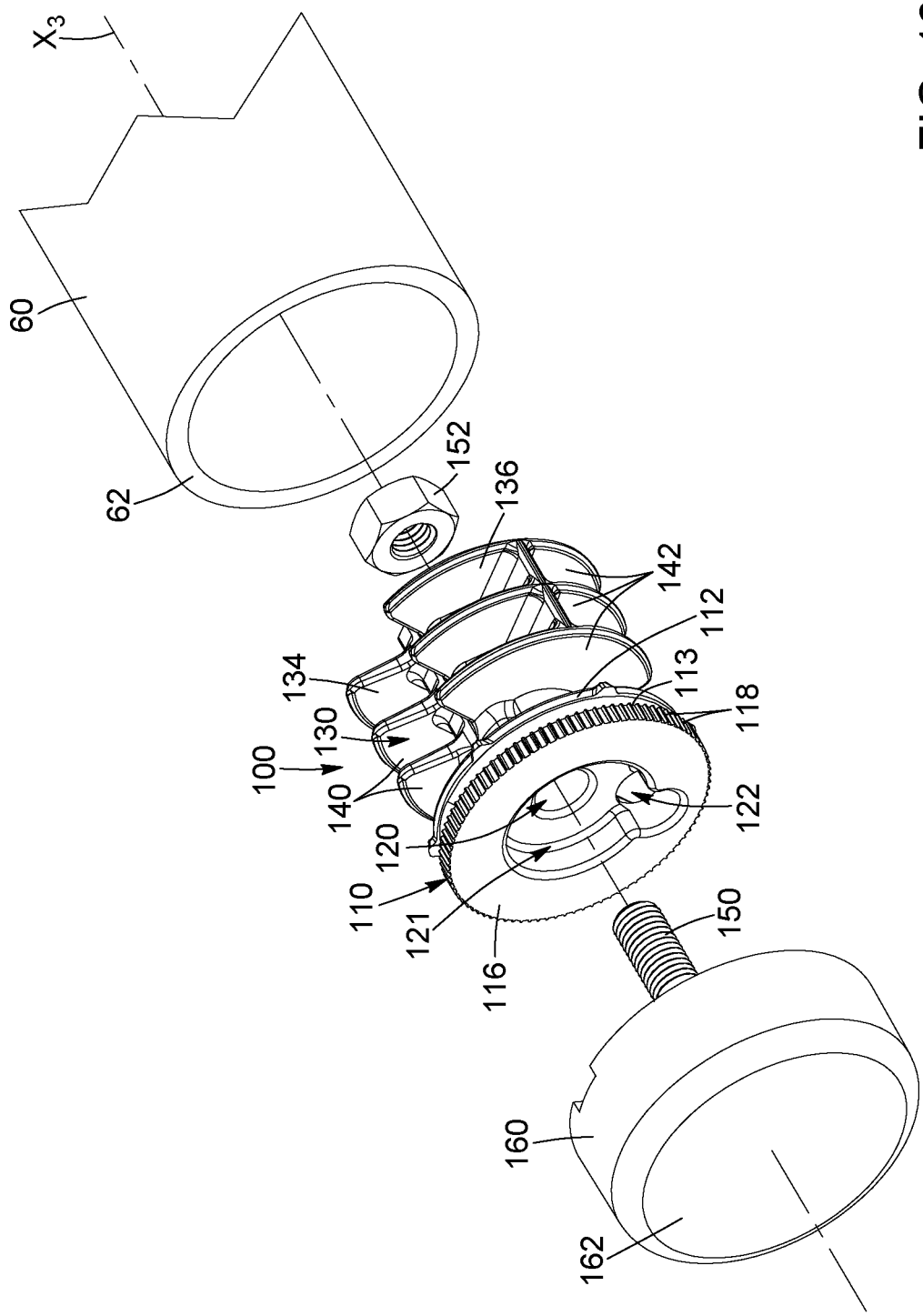
FIG. 12 is a first side perspective view, exploded, of a handrail section of the handrail assembly of FIG. 1, the handrail section comprising a tubular handrail element, the pipe-coupling handrail element connector of FIG. 2 and a handrail cap.
Figure 13:
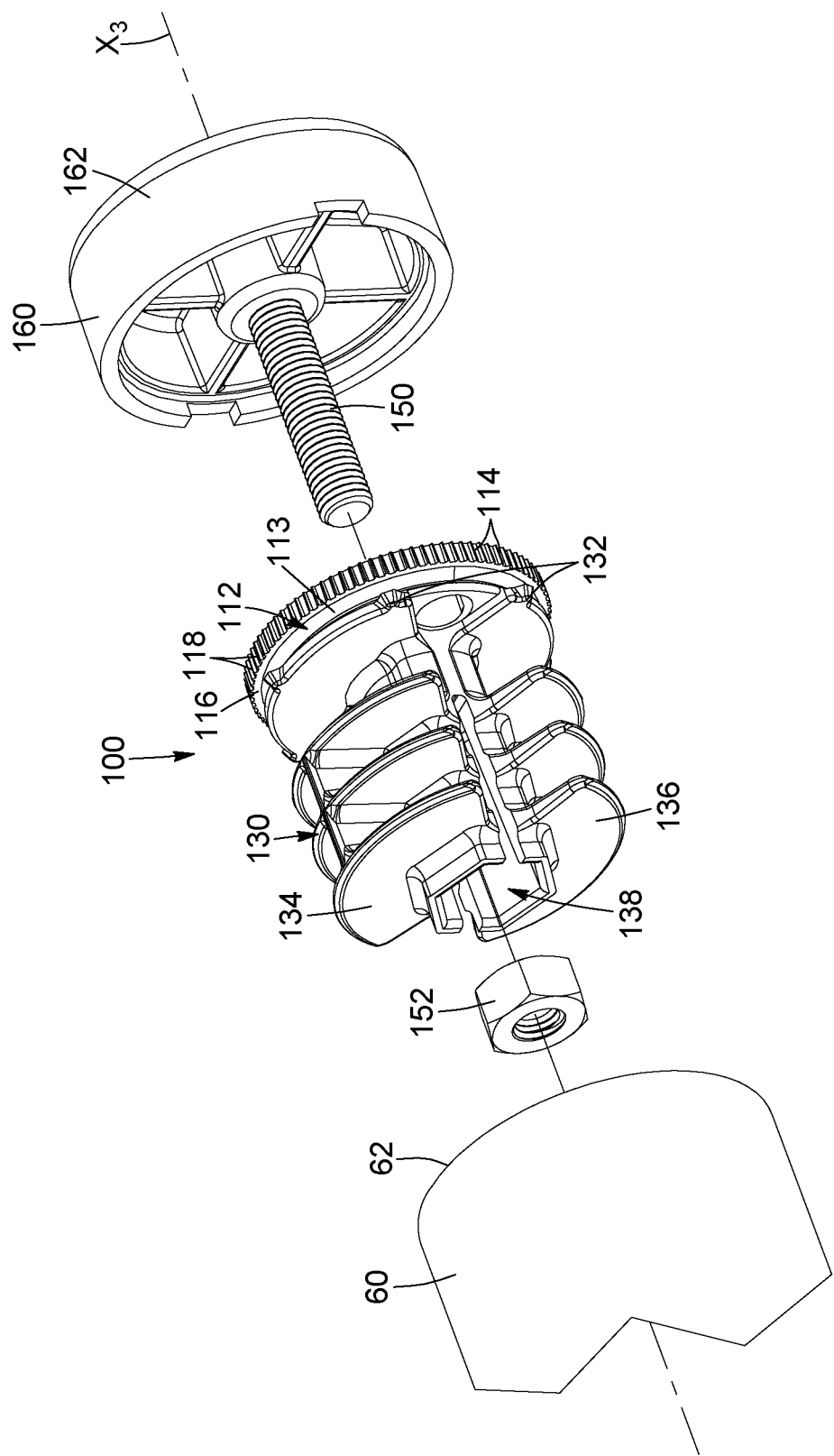
FIG. 13 is a second side perspective view, exploded, of the handrail section of FIG. 12.

FIGS. 12 and 13 represent another possible embodiment of the handrail element connector in accordance with the present disclosure. In this embodiment, the handrail element connector is configured as a pipe-coupling handrail element connector 100 which is shaped and dimensioned to be coupled both angularly and axially to a pipe element 60 (i.e. a handrail element having a substantially tubular shape). The pipe element 60 can be substantially similar to the tubular handrail element 20 which, as explained above, may include an existing, off-the-shelf tube or pipe of an appropriate size. In the embodiment shown, the pipe element 60 has a substantially circular cross-section but alternatively, the pipe element 60 could have any other shape.

The pipe-coupling handrail element connector 100 comprises, substantially similarly to the above-described disc-shaped handrail element connector 300, a connector axis $X_3$, substantially parallel to a longitudinal axis of the pipe element 60 when engaged therewith (i.e. substantially coaxial with the pipe element 60 when engaged therewith), and a first connecting portion 110. Similarly to the disc-shaped handrail element connector 300, the first connecting portion 110 of the pipe-coupling handrail element connector 100 has one or more axial couplers 112 axially couplable to an inner surface of a first handrail element (not represented in FIGS. 12 and 13) and one or more angular couplers 114 angularly couplable to the inner surface of the first handrail element.

In the embodiment shown, the axial couplers 112 comprise a coupling groove (or connecting groove) which has a substantially V-shaped cross-section and which extends along at least a portion of an outer periphery of a first connector body 113. In the embodiment shown, the coupling groove extends substantially along the entire circumference of the first connector body 113. The first connecting portion 110 further comprises a coupling flange 116 (or toothed ring 116), for instance forming a first free end portion of the pipe-coupling handrail element connector 100. The angular couplers 114 comprise a plurality of coupling teeth 118 formed on an outer periphery of the coupling disc 116. In the embodiment shown, and similarly to the above-described disc-shaped handrail element connector 300, a fastener-receiving through opening 120 and a cable-receiving aperture 122 (or wire-receiving through opening 122) are formed in the coupling disc 116.

The pipe-coupling handrail element connector 100 further comprises an expandable connecting portion 130 (or pipe-engaging portion 130) at least partially engageable in the pipe element 60 and at least one of axially and angularly couplable therewith.

In the embodiment shown, the expandable connecting portion 130 comprises radial protrusions 132 extending radially from an outer surface of the connector body 113. The expandable connecting portion 130 (or pipe-connecting end portion 130) further comprises first and second pipe-connecting arms 134, 136 at least partially spaced-apart from each other and defining therebetween a fastener-receiving channel 138.

The fastener-receiving channel 138 opens in the coupling disc 116 and forms therein the above-mentioned fastener-receiving through opening 120.

Each of the first and second pipe-connecting arms 134, 136 comprises one or more expandable pipe-engaging ribs 142. In the embodiment illustrated in FIGS. 12 and 13, each expandable pipe-engaging rib 142 is substantially disc-shaped and extends substantially transversely relative to the connector axis $X_3$.

The fastener-receiving channel 138 is substantially tapered, for instance towards the first connecting portion 110, such that, upon engagement of a fastener 150 (or expansion fastener 150) in the fastener-receiving channel 138 via the fastener-receiving through opening 120, the first and second pipe-connecting arms 134, 136 are radially moved away from each other. In other words, upon engagement of the expansion fastener 150 in the tapered fastener-receiving channel 138, a cross-section of the expandable pipe-engaging portion 130 increases (i.e. the expandable connecting portion 130 radially expands).

It is thus understood that to angularly and/or axially couple together the pipe-coupling handrail element connector 100 and the pipe element 60, the expandable pipe-engaging portion 130 thereof is firstly at least partially engaged in an inner cavity of the pipe element 60. In the embodiment shown, the expandable connection portion 130 is engaged in the inner cavity of the pipe element 60, for instance until the radial protrusions 132 are substantially flush with a free end portion 62 of the pipe element 60. The expansion fastener 150 is then introduced into the fastener-receiving through opening 120 and the tapered fastener-receiving channel 138 so as to radially expand the expandable connecting portion 130 in the pipe element 60. In the embodiment shown, the expandable ribs 142 (at least a free end portion thereof) are formed in a material providing some axial and/or angular friction forces between the pipe-coupling handrail element connector 100 and the inner surface of the connected pipe handrail element 60. For instance, the expansion fastener 150 may cooperate with an expansion nut 152 to be engaged with and secured to the pipe-coupling handrail element connector 100.

In the embodiment shown in FIGS. 12 and 13, the fastener 150 is part of a handrail cap 160 which comprises a cap body 162 from which the fastener 150 extends. The handrail cap 160 is thus shaped and dimensioned, upon engagement of the fastener 150 in the tapered fastener-receiving channel 138, to close the pipe element 60 (i.e. to cap the tubular pipe element 60). Moreover, the handrail cap 160 can be shaped and dimensioned such that a support member (such as for instance a glass panel) between the cap body 162 and the pipe element 60.

It is understood that any other mechanical fastener could be used to be engaged in the tapered fastener-receiving channel 138. For instance, a cap-less fastener could be used. In case the fastener would comprise a head (not represented), the fastener head could be received in a fastener-receiving cavity 121 formed in the coupling flange 116 and at least partially surrounding the fastener-receiving through opening 120. The first connecting portion 110 of the pipe-coupling handrail element connector 100 would thus remain accessible for a handrail element having an inner lip to be engaged therewith.

It is thus understood that the pipe-coupling handrail element connector 100 makes it possible to connect together different types of handrail elements, for instance an extruded handrail element having an inner lip (as the ones connected by the above-described disc-shaped handrail element connector) and a pipe element (i.e. a handrail element having a substantially cylindrical inner cavity with a substantially smooth inner surface). The pipe-coupling handrail element connector 100 is further shaped and dimensioned to at least one of angularly and axially couple together the two connected handrail elements. The pipe-coupling handrail element connector 100 could also be used to connect a handrail element to a support structure such as a wall.

It is appreciated that the shape and the configuration of the pipe-coupling handrail element connector 100 can vary from the embodiment shown. For instance, the shape, the configuration, the number and/or the location of the first connecting portion, the angular and axial couplers thereof, the expandable pipe-engaging portion, the radial protrusions, the first and second pipe-connecting arms and the expandable ribs thereof can vary from the embodiment shown.

Figure 14:
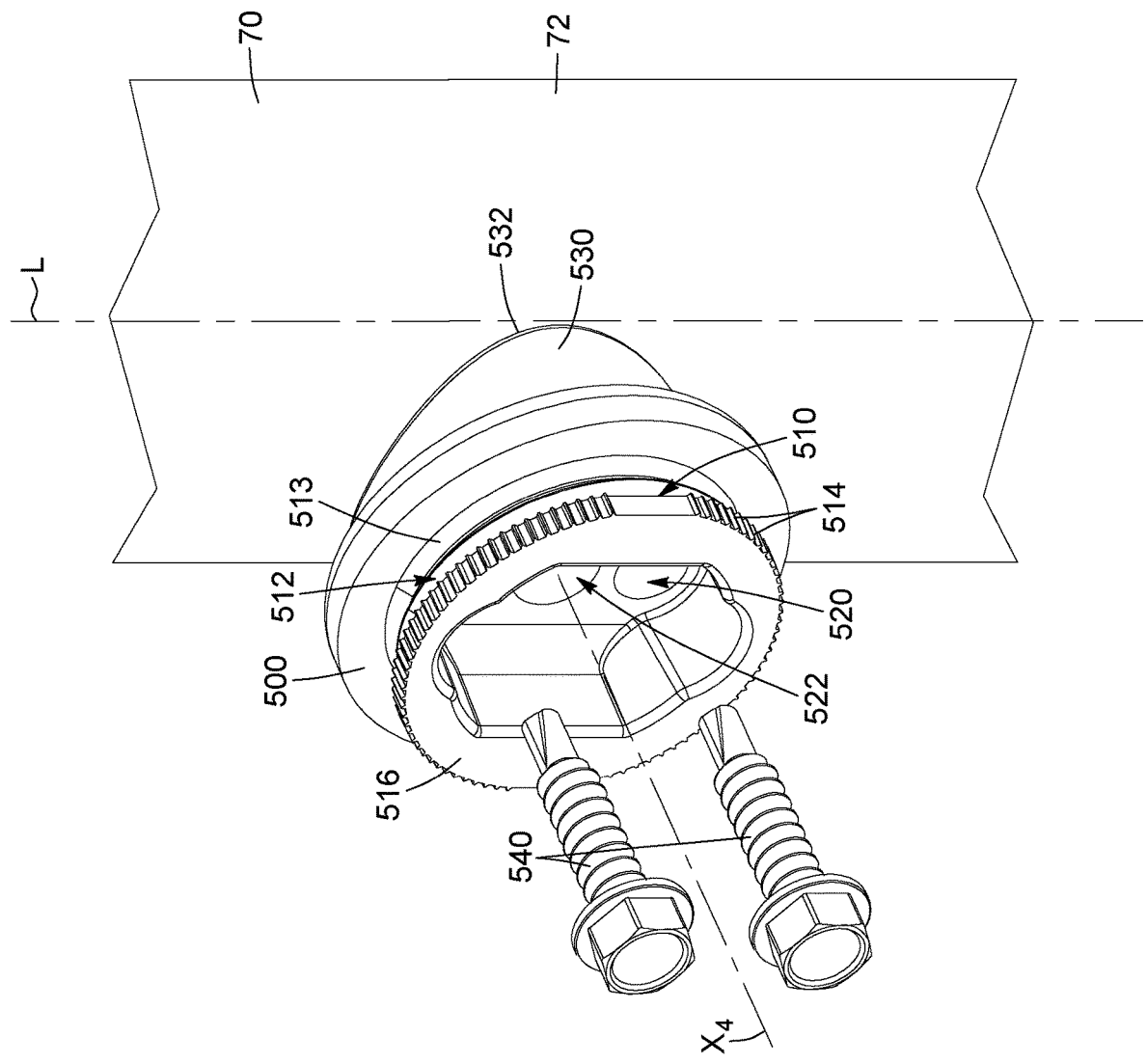
FIG. 14 is a partially exploded side perspective view of a handrail element connector in accordance with another embodiment, the handrail element connector being coupled to an outer face of a handrail element.

FIG. 14 represents another possible embodiment of the handrail element connector in accordance with the present disclosure. In this embodiment, the handrail element connector includes a T-shaped handrail element connector 500 that is shaped and dimensioned to be coupled to an outer surface 72 of a handrail element 70.

The T-shaped handrail element connector 500 comprises, substantially similarly to the above-described disc-shaped handrail element connector 300, a connector axis $X_4$, substantially transversal (for instance substantially perpendicular) to a longitudinal axis L of the handrail element 70 when engaged therewith (i.e. when engaged with the outer surface 72 thereof), and a first connecting portion 510. Similarly to the disc-shaped handrail element connector 300, the first connecting portion 510 of the T-shaped handrail element connector 500 has one or more axial couplers 512 axially couplable to an inner surface of a first handrail element (not represented in FIG. 14) and one or more angular couplers 514 angularly couplable to the inner surface of the first handrail element.

In the embodiment shown, the axial couplers 512 comprise one or more coupling grooves (or connecting grooves) extending along at least a portion of an outer periphery of a first connector body 513. Specifically, in the embodiment shown, the axial couplers 512 comprises two coupling grooves having a substantially V-shaped cross-section which extend substantially along the entire circumference of the first connector body 513. The first connecting portion 510 further comprises a coupling flange 516 (or toothed ring 516) which defines a first free end portion of the T-shaped handrail element connector 500. The angular couplers 514 comprise a plurality of coupling teeth 518 formed on an outer periphery of the coupling disc 516. In the embodiment shown, and similarly to the above-described disc-shaped handrail element connector 300, one or more fastener-receiving through openings 520 and one or more cable-receiving apertures 522 (or wire-receiving through openings 522) are formed in the coupling disc 516.

The T-shaped handrail element connector 500 further comprises an outer surface-coupling portion 530. In the embodiment shown, the outer surface-coupling portion 530 is substantially cylindrical and substantially coaxial with the connector axis $X_4$. The outer surface-coupling portion 530 comprises a second connection portion or free end portion 532 opposed to the first connecting portion 510. The free end portion 532 of the outer surface-coupling portion 530 (substantially curved, in the embodiment shown) is shaped and dimensioned to substantially conform to a portion of the outer surface 72 of the handrail element 70. More specifically, in the illustrated embodiment, the outer surface 72 of the handrail element 70 is substantially cylindrical such that the free end portion 532 has a substantially arcuate shape.

Still in the illustrated embodiment, the free end portion 532 is shaped and configured to extend over about a quarter of the circumference of the outer surface 72 of the handrail element 70. In other words, the free end portion 532 has a substantially arcuate shape extending over an angle of about 90 degrees. This configuration allows another T-shaped handrail element connector to be secured to the outer surface 72 of the handrail element 70 adjacent the connector 500 such that the connector axes $X_4$ of the two connectors 500 are angled at about 90 degrees relative to each other. This configuration would further allow four T-shaped handrail element connectors 500 to be secured to the outer surface 72 of the handrail element 70 if desired. In another embodiment, the free end portion 532 could instead have a substantially arcuate shape extending over an angle of less or more than 90 degrees.

In the embodiment shown, the fastener-receiving through openings 520 are shaped and dimensioned to receive at least one mechanical fastener 540 (such as, for instance, one or more self-drilling screws, rivets, rivet-nuts, machine screws or any other suitable mechanical fasteners) extending at least partially through a peripheral wall portion of the handrail element 70 so as to secure the T-shaped handrail element connector 500 thereto when the outer surface-coupling portion 530 is engaged with the outer surface 72 thereof. It is understood that some of the fastener-receiving through openings 520 could also be used to receive wires or cables, such as electrical wires.

It is thus understood that the T-shaped handrail element connector 500 makes it possible to connect together different types of handrail elements, for instance a handrail element having an inner lip (as the ones connected by the above-described disc-shaped handrail element connector) via the first connecting portion 510 and an additional handrail element via the outer surface-coupling portion 530 engaged with the outer surface thereof. Once connected to each other, the handrail elements extend substantially transversally to each other (for instance substantially perpendicularly to each other, in the embodiment shown). The T-shaped handrail element connector 500 is further shaped and dimensioned to angularly and axially couple together the two connected handrail elements.

It is appreciated that the shape and the configuration of the T-shaped handrail element connector 500 can vary from the embodiment shown. For instance, the shape, the configuration, the number and/or the location of the first connecting portion, the angular and axial couplers thereof, and the outer surface-coupling portion can vary from the embodiment shown.

Figure 15:
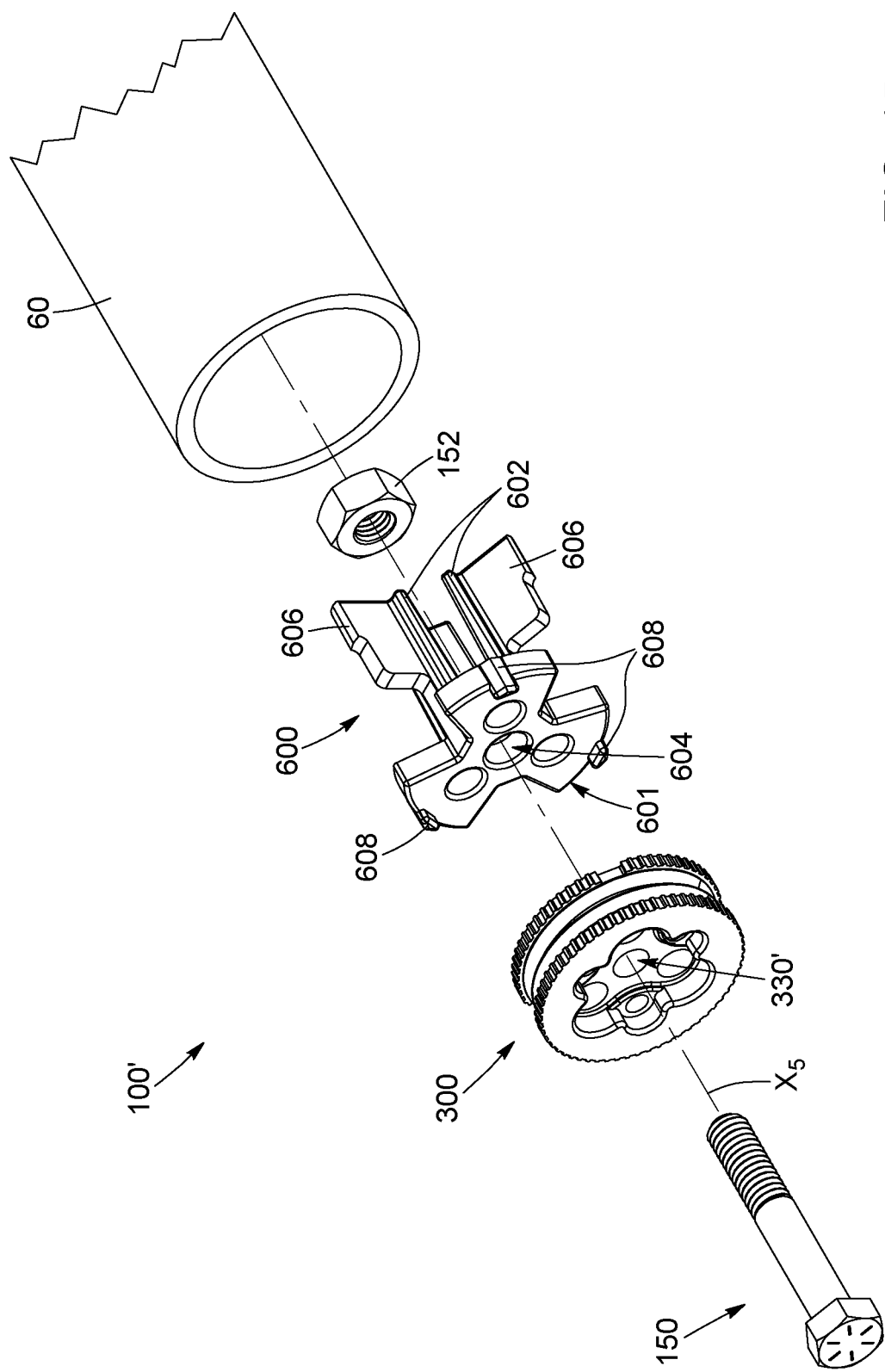
FIG. 15 is a perspective view, exploded, of a handrail section comprising a pipe-coupling handrail element connector, in accordance with another embodiment, connected to a pipe element.

FIG. 15 shows yet another possible embodiment of the handrail element connector in accordance with the present disclosure. In this embodiment, the handrail element connector is configured as a pipe-coupling handrail element connector 100' which is substantially similar to the pipe-coupling handrail element connector 100 shown in FIGS. 12 and 13. Specifically, the pipe-coupling handrail element connector 100' is shaped and dimensioned to be coupled both angularly and axially to a pipe element such as the pipe element 60.

In this embodiment, instead of being made of a single, unitary piece, the pipe-coupling handrail element connector 100' includes two distinct portions which are assemblable together to form the pipe-coupling handrail element connector 100': a first connecting portion for connection to a handrail element and a second connecting portion for connection to the pipe element 60. In the illustrated embodiment, the first connecting portion includes a disc-shaped handrail element connector such as the disc-shaped handrail element connector 300 described above. The second connecting portion includes an expendable connecting member 600 substantially similar to the expendable connecting portion 130 of the pipe-coupling handrail element connector 100. More specifically, the expendable connecting member 600 is at least partially engageable in the pipe element 60 and includes an expendable connecting member body 601 and a plurality of pipe-connecting arms 602 extending away from the expendable connecting member body 601. The plurality of pipe-connecting arms 602 are at least partially spaced-apart from each other to define therebetween a fastener-receiving channel 604. The fastener-receiving channel 604 extends along a longitudinal connector axis $X_5$ of the pipe-coupling handrail element connector 100'.

Alternatively, instead of being made of a single piece, the expendable connecting member 600 could be made of multiple distinct pieces assembled together. For example, the expendable connecting member body 601 and the plurality of pipe-connecting arms 602 could be provided as separate pieces. In yet another embodiment, the expendable connecting member 600 may not even include a connecting member body 601 and may only include the plurality of pipe-connecting arms 602 connected together so as to form the fastener-receiving channel 604.

The disc-shaped handrail element connector 300 and the expendable connecting member 600 are connected together by an expansion fastener such as the expansion fastener 150. In this embodiment, the expansion fastener 150 is shown as a standalone fastener rather than being included in a handrail cap 160 but alternatively, the expansion fastener 150 could be included in a handrail cap 160 as shown in FIGS. 12 and 13.

The expansion fastener 150 is adapted to be received in a central fastener-receiving opening 330' of the disc-shaped handrail element connector 300 and the fastener-receiving channel 604 of the expendable connecting member 600. Specifically, the expansion fastener 150 is adapted to threadably engage an expansion nut such as the expansion nut 152 which is received in the fastener-receiving channel 604. The fastener-receiving channel 604 is tapered such that when the expansion fastener 150 engages the fastener-receiving channel 604 and the expansion nut 152 and is turned so as to be further screwed into the expansion nut 152, the expansion nut 152 moves towards the expendable connecting member body 601 which causes the pipe-connecting arms 602 to move radially outwardly and abut an inner surface of the pipe element 60.

Still in this embodiment, instead of including pipe engaging ribs which extend substantially transversely relative to the connector axis, the expendable connecting member 600 includes a plurality of expandable pipe-engaging ribs 606 which extend along the arms 602 and parallel to the longitudinal connector axis $X_5$ of the pipe-coupling handrail element connector 100'.

In the illustrated embodiment, the expendable connecting member 600 further includes a plurality of mounting protrusions 608 extending radially outwardly from the expendable connecting member body 601. The mounting protrusions 608 are shaped and dimensioned to form an interference fit between the expendable connecting member body 601 and the pipe element 60. In this embodiment, the expendable connecting member body 601 may need to be forced into position into the pipe element 60, for example by tapping the expendable connecting member body 601 with a hammer. Alternatively, the expendable connecting member 600 may not include any mounting protrusions.

In this embodiment, to facilitate the installation of the pipe-coupling handrail element connector 100' in the pipe element 60, the expansion fastener 150 may be engaged through the expendable connecting member body 601 and with the nut 152 located in the fastener-receiving channel 604 before the expendable connecting member body 601 is inserted into the pipe element 60. Once the pipe-coupling handrail element connector 100' is positioned in the pipe element 60, the expansion fastener 150 may be turned to cause the pipe-connecting arms 602 to move radially outwardly and abut the inner surface of the pipe element 60, thereby further locking the pipe-coupling handrail element connector 100' into place in the pipe element 60. Alternatively, the pipe-coupling handrail element connector 100' could be installed in the pipe element 60 using any other appropriate method.

Figure 16:
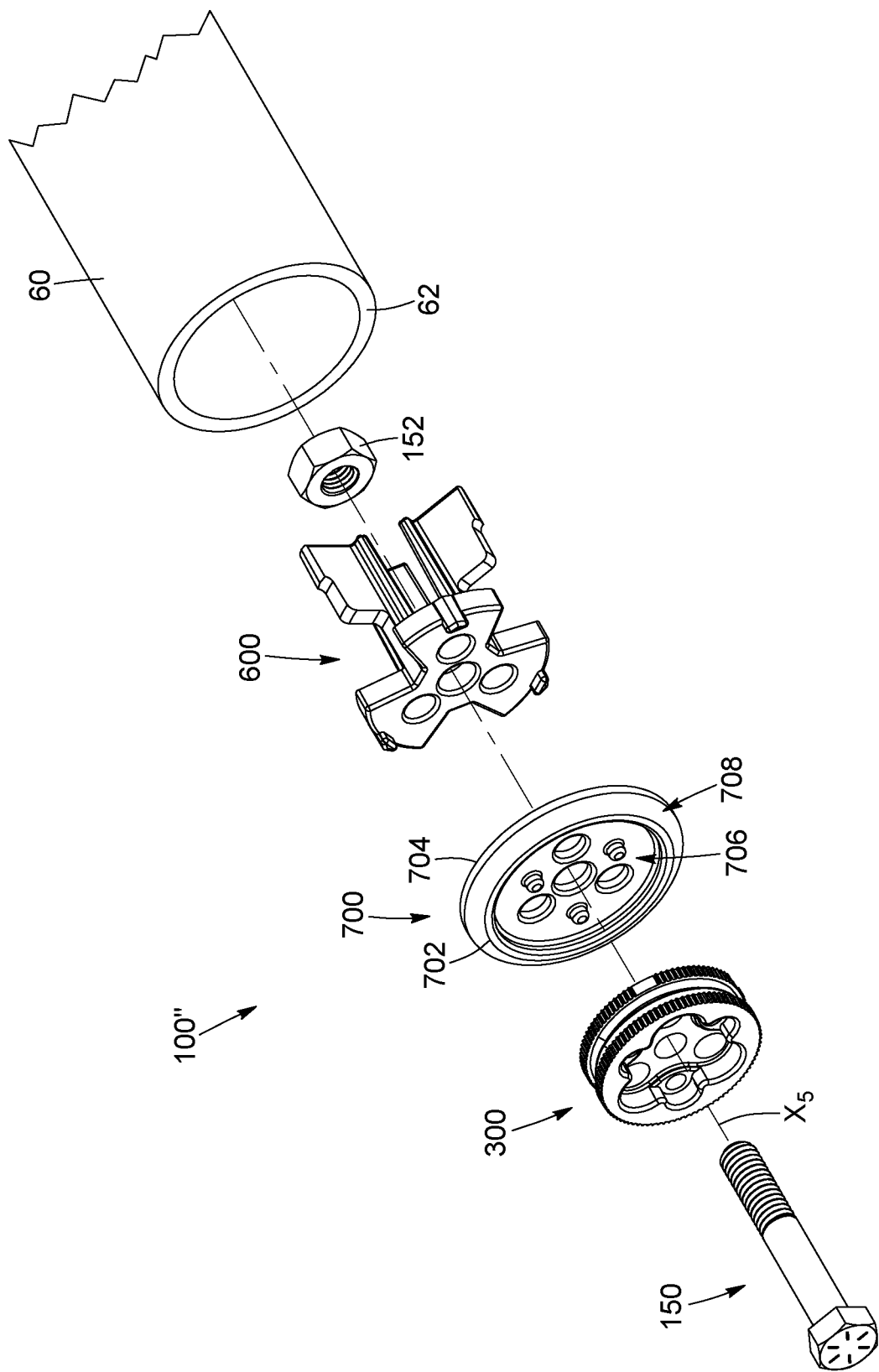
FIG. 16 is a perspective view, exploded, of a handrail section comprising a pipe-coupling handrail element connector, in accordance with yet another embodiment, connected to a pipe element.

FIG. 16 shows yet another possible embodiment of the handrail element connector in accordance with the present disclosure. In this embodiment, the handrail element connector is configured as a pipe-coupling handrail element connector 100'' which is substantially similar to the pipe-coupling handrail element connector 100' shown in FIG. 15. Specifically, the pipe-coupling handrail element connector 100'' includes a disc-shaped handrail element connector such as the disc-shaped handrail element connector 300 and an expendable connecting member such as the expendable connecting member 600. In this embodiment, the disc-shaped handrail element connector 300 has a diameter which is substantially smaller than a diameter of the pipe element 60 in which the expendable connecting member 600 is at least partially inserted. Still in this embodiment, the expendable connecting member 600 is still shaped and dimensioned such that an interference fit is formed between the expendable connecting member 600 and the pipe element 60.

In this embodiment, the pipe-coupling handrail element connector 100'' further includes a connector adaptor 700 which is configured to be positioned between the disc-shaped handrail element connector 300 and the expendable connecting member 600. Specifically, the connector adaptor 700 is generally disc-shaped and includes a disc connector face 702 oriented towards the disc-shaped handrail element connector 300 and an expendable connecting member face 704 oriented towards the expendable connecting member 600. In this embodiment, the connector adaptor 700 includes a disc-receiving recess 706 shaped and dimensioned to receive the disc-shaped handrail element connector 300, and an adaptor rim 708 which extends radially outwardly from the disc-receiving recess 706. The adaptor rim 708 has a diameter which is substantially similar to the diameter of the pipe element 60 such that when the adaptor rim 708 is placed against the free end portion 62 of the pipe element 60, the adaptor rim 708 provides a substantially smooth transition between the pipe element 60 and the disc-shaped handrail element connector 300 received in the disc-receiving recess 706. The adaptor 700 could therefore be used to connect together two pipe elements having different diameters, for example. It will also be understood that the same disc-shaped handrail element connector 300 could therefore be used with pipe elements of different diameters by selectively using or omitting the adaptor 700 depending on the diameter of the pipe element.

In one embodiment, the adaptor 700 could further be used to mount the disc-shaped handrail element connector 300 to a planar surface such as a wall or a glass panel instead of a pipe element. Specifically, the expendable connecting member face 704 could be placed against the planar surface instead of being placed against the free end portion 62 of the pipe element 60. This configuration may provide a substantially smooth transition between a handrail element connected to the disc-shaped handrail element connector 300 and the planar surface. In one embodiment, the adaptor 700 could further include a circular peripheral groove, not shown, defined in the expendable connecting member face 704 for receiving an O-ring seal which creates a seal between the adaptor 700 and the planar surface when the adaptor 700 is secured against the planar surface. It will therefore be appreciated that the adaptor 700 as described hereinabove may advantageously have multiple uses and may be used in various applications.

As detailed above, it is thus understood that the handrail element connectors in accordance with the different above-described embodiments are all shaped and dimensioned to couple together adjacent first and second handrail elements (or any rail element of a rail assembly comprising handrail and/or safety guardrail sections). The handrail element connectors are configured to be at least one of axially and angularly coupled to the first and/or second handrail elements. In other words, the handrail element connectors are shaped and dimensioned to prevent the connected handrail elements from moving axially relative to each other and/or to prevent the connected handrail elements from rotating relative to each other. Moreover, the handrail element connectors, in particular via the above-described teeth of the connecting portion thereof, allow the connected handrail elements to be locked at one of multiple angular positions relative to each other (the number and positions of the multiple possible angular positions of the first and second connected handrail elements depending on the number, shape, dimensions and/or position of the teeth of the connecting portion).

The present disclosure also concerns a kit for forming a rail assembly or a rail section thereof (for instance a handrail assembly or a handrail section thereof), the kit comprising one or more handrail element connectors and one or more handrail elements at least one of angularly and axially connectable to each other via the one or more handrail element connectors.

The adjacent handrail elements can either extend along a single longitudinal axis, either linear or curved. The adjacent handrail elements can alternatively extend substantially transversally to each other (for instance with one of the first and second handrail elements extending from an outer surface of the other one of the first and second handrail elements via the above-described T-shaped handrail element connector). The handrail element connectors are also shaped and dimensioned to allow changing the curvature of the handrail section formed by the connected first and second handrail elements and/or the relative angular positions of the first and second handrail elements, in order to adapt, for instance, the adjacent configuration of the first and second handrail elements to different angled walls.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited by the scope of the appended claims.

For instance, even if in the embodiments shown, the handrail cap 160 is disclosed as being couplable to a pipe-coupling handrail element connector, it could be conceived handrail caps couplable with any one of the different disclosed embodiments of the handrail element connectors.

Moreover, while the present description refers to handrail element connectors for connecting two handrail elements, the person skilled in the art will understand that the handrail element connectors may be adapted for connecting tubes or tubular structures other than handrail elements. The tubular structures to be connected together may be hollow or partially hollow. For example, only one end of a tubular structure may be hollow in order to allow the handrail element connector to be inserted into the hollow portion of the tubular structure for attachment purposes while the remaining of the tubular structure is solid. It should be understood that the tubular structure may also be solid along its entire length. For example, the handrail element connector may be adapted to connect together two angled safety railings or railing sections, two angled grab bars or grab bar sections, two angled footrests or footrest sections, two angled curtain rods or rod sections, and/or the like.

Even if the disclosed embodiments of the handrail element connectors comprise two connecting portions, it could also be conceived handrail element connectors that would comprise more than two connecting portions (for instance handrail element connectors having a substantially Y-shape so as to connect together three handrail elements of same or different types). Moreover, the different disclosed handrail element connectors could be used to connect together different handrail elements, or to close a handrail element (via, for instance, the above-disclosed handrail cap), or to mount a handrail element to a support structure such as a wall. It could also be conceived handrail element connectors having only one single connecting portion at least one of angularly and axially couplable to a first handrail element, the handrail element connectors being also couplable to a second handrail element, a wall support, a ground surface or the like.

The invention claimed is:

1. A handrail element connector for connecting together first and second handrail elements, at least one of the first and second handrail elements including a first handrail element internal cavity having a handrail element axial coupling portion and a handrail element angular coupling portion located in the first handrail element internal cavity, the handrail element connector comprising:
   at least one connecting portion engageable with the first handrail element internal cavity, the connecting portion including:
      at least one connector axial coupling portion couplable to the handrail element axial coupling portion to prevent axial movement of the handrail element connector relative to the first handrail element, wherein said at least one connector axial coupling portion includes a coupling flange defining a first abutting surface for abutting a second abutting surface defined in the first handrail element internal cavity; and
      at least one connector angular coupling portion couplable to the handrail element angular coupling portion to prevent rotation of the handrail element connector relative to the first handrail element.

2. The handrail element connector according to claim 1, wherein the at least one connecting portion includes a first connecting portion for engaging the first handrail element cavity and a second connecting portion for engaging a second handrail element internal cavity of the second handrail element, the handrail element connector being fully enclosed in the first and second handrail element internal cavities when the first and second handrail elements are connected together.

3. A kit for forming a handrail portion comprising:
   first and second handrail elements; and
   a handrail element connector according to claim 1;
   wherein the handrail element connector is axially and angularly couplable to at least one of the first and second handrail elements.

4. A handrail assembly including:
   a first handrail element including a first element internal cavity having a first handrail element axial coupling portion and a first handrail element angular coupling portion located therein;
   a second handrail element;
   a handrail element connector for connecting together the first and second handrail elements, the handrail element connector including:
      at least one connecting portion engageable with the first element internal cavity, the connecting portion including:
         at least one connector axial coupling portion couplable to the handrail element axial coupling portion to prevent axial movement of the connector relative to the handrail element, wherein said at least one connector axial coupling portion includes a coupling flange defining a first abutting surface and wherein the first handrail element axial coupling portion includes a second abutting surface for abutting the first abutting surface; and at least one connector angular coupling portion couplable to the handrail element angular coupling portion to prevent rotation of the connector relative to the handrail element.

5. The handrail assembly as claimed in claim 4, wherein the at least one connecting portion includes a first connecting portion for engaging the first element internal cavity.

6. The handrail assembly as claimed in claim 5, wherein the first handrail element is a straight handrail element and the second handrail element is a curved handrail element.

7. The handrail assembly as claimed in claim 6, wherein the curved handrail element includes lower and upper handrail portions which substantially define opposite halves of the curved handrail element.

8. The handrail assembly as claimed in claim 7, wherein the lower and upper handrail portions are connectable to each other using at least one mechanical fastener.

9. The handrail assembly as claimed in claim 8, wherein the handrail element connector is disc-shaped and has a connector axis.

10. The handrail assembly as claimed in claim 9, wherein the handrail element connector is symmetrical about a central symmetry plane extending substantially perpendicularly to the connector axis.

11. The handrail assembly as claimed in claim 10, wherein the handrail element connector has a connector body and the connector axial coupling portion includes a coupling groove extending along at least a portion of an outer periphery of the connector body.

12. The handrail assembly as claimed in claim 7, further comprising at least one spacing handrail element connector configured to be positioned between the handrail element connector and the second handrail element for connecting the handrail element connector to the second handrail element.

13. The handrail assembly as claimed in claim 4, wherein the connector angular coupling portion includes a first plurality of coupling teeth extending substantially radially outwardly away from a central longitudinal axis of the connector, and further wherein the first handrail element includes a second plurality of coupling teeth extending substantially radially inwardly into the first handrail element internal cavity, the first plurality of teeth being shaped and dimensioned to engage the second plurality of teeth.

14. The handrail assembly as claimed in claim 13, wherein the coupling teeth are formed on at least a portion of the outer periphery of the coupling flange.

15. The handrail assembly as claimed in claim 14, wherein the outer periphery of the coupling flange comprises at least one teeth-free portion.

16. The handrail assembly as claimed in claim 4, wherein the second handrail element includes a second element internal cavity having a second handrail element axial coupling portion and a second handrail element angular coupling portion located therein, and wherein the at least one connecting portion includes a second connecting portion for engaging the second element internal cavity.

17. The handrail assembly as claimed in claim 4, wherein the handrail element connector comprises at least one fastener-receiving through opening, each fastener-receiving through opening being shaped and dimensioned to receive a corresponding connector fastener.

18. The handrail assembly as claimed in claim 4, wherein the handrail element connector includes at least one fastener-engaging opening.

19. The handrail assembly as claimed in claim 4, wherein the second handrail element includes an extruded handrail element.

20. The handrail assembly as claimed in claim 4, wherein the second handrail element includes a pipe element.

21. The handrail assembly as claimed in claim 20, wherein the handrail element connector includes an expandable connecting portion at least partially engageable in the pipe element and at least one of axially and angularly couplable therewith.

22. The handrail assembly as claimed in claim 4, wherein the handrail element connector is configured to be connected to an outer surface of the second handrail element.

23. A handrail element connector for connecting together first and second handrail elements, at least one of the first and second handrail elements including a first handrail element internal cavity having a handrail element axial coupling portion and a handrail element angular coupling portion located in the first handrail element internal cavity, the handrail element connector comprising:

at least one connecting portion engageable with the first handrail element internal cavity, the connecting portion including:
    at least one connector axial coupling portion couplable to the handrail element axial coupling portion to prevent axial movement of the handrail element connector relative to the first handrail element; and
    at least one connector angular coupling portion couplable to the handrail element angular coupling portion to prevent rotation of the handrail element connector relative to the first handrail element, wherein the at least one connector angular coupling portion includes a plurality of coupling teeth extending substantially radially outwardly away from a central longitudinal axis of the handrail element connector, the coupling teeth being shaped and dimensioned to engage corresponding teeth located in the first handrail element internal cavity.

24. The handrail element connector according to claim 23, wherein the at least one connecting portion includes a first connecting portion for engaging the first handrail element cavity and a second connecting portion for engaging a second handrail element internal cavity of the second handrail element, the handrail element connector being fully enclosed in the first and second handrail element internal cavities when the first and second handrail elements are connected together.

25. A kit for forming a handrail portion comprising:
first and second handrail elements; and
a handrail element connector according to claim 23;
wherein the handrail element connector is axially and angularly couplable to at least one of the first and second handrail elements.

* * * * *